(12) United States Patent
Teo et al.

(10) Patent No.: US 7,813,739 B2
(45) Date of Patent: Oct. 12, 2010

(54) METHOD FOR REDUCING INTER-CELL INTERFERENCE IN WIRELESS OFDMA NETWORKS

(76) Inventors: Koon Hoo Teo, 4232 Lexington Ridge, Lexington, MA (US) 02421; Yingda Chen, 8 Duh Dr., Apt. 123, Bethlehem, PA (US) 18015; Philip V. Orlik, 189 Richdale Ave., Unit B4, Cambridge, MA (US) 02140; Jinyun Zhang, 170 Gore St., Unit 616, Cambridge, MA (US) 02141

( * ) Notice: Subject to any disclaimer, the term of this patent is extended or adjusted under 35 U.S.C. 154(b) by 609 days.

(21) Appl. No.: 11/862,263

(22) Filed: Sep. 27, 2007

(65) Prior Publication Data

US 2009/0088176 A1 Apr. 2, 2009

(51) Int. Cl.
*H04W 72/00* (2009.01)

(52) U.S. Cl. .............. 455/450; 455/423; 455/424; 455/425; 455/501; 455/63.1; 455/67.13; 370/322; 370/341; 370/348

(58) Field of Classification Search ........... 455/63.1, 455/67.13, 423, 424, 425, 450, 501; 370/322, 370/341, 348
See application file for complete search history.

(56) References Cited

U.S. PATENT DOCUMENTS

| 5,239,557 | A | * | 8/1993 | Dent | 370/342 |
|---|---|---|---|---|---|
| 5,239,676 | A | * | 8/1993 | Strawczynski et al. | 455/437 |
| 5,844,894 | A | * | 12/1998 | Dent | 370/330 |
| 5,859,841 | A | * | 1/1999 | Gitlits | 370/335 |
| 6,078,815 | A | * | 6/2000 | Edwards | 455/450 |
| 7,386,306 | B2 | * | 6/2008 | Laroia et al. | 455/422.1 |
| 7,668,530 | B2 | * | 2/2010 | Reudink | 455/405 |
| 2003/0162546 | A1 | * | 8/2003 | Jordan | 455/446 |
| 2004/0190640 | A1 | * | 9/2004 | Dubuc et al. | 375/260 |
| 2005/0047259 | A1 | * | 3/2005 | Ahn et al. | 365/232 |
| 2006/0126493 | A1 | * | 6/2006 | Hashem et al. | 370/208 |
| 2008/0167064 | A1 | * | 7/2008 | Bar-Ness et al. | 455/522 |

* cited by examiner

*Primary Examiner*—Stephen M D'Agosta
(74) *Attorney, Agent, or Firm*—Dirk Brinkman; Gene Vinokur

(57) ABSTRACT

Protocols for OFDM/OFDMA/SC-FDMA based wireless networks provide adaptive inter-cell interference management without explicit spectrum or frequency planning. Base stations and mobile stations acquire information about subcarrier allocation from a handoff protocol. The mobile stations can also acquire this information using cognitive sensing. Cognitive sensing can be rewarded by the base station. Using this information, subcarriers can be allocated randomly, with blind optimization, or by joint optimization. The stations can use game theory to select among the different optimization strategies.

26 Claims, 15 Drawing Sheets

BINARY STACKELBERG DECISION MAKING($i,j$)

comment: Sequential leader-follower decision making.

initialization: BS $i$ and $j$ exchange information on available subcarriers for BS $i$:

do $\begin{cases} \text{predicts } A_j^{A_i}, A_i = \text{O or NO} & \text{(i)} \longrightarrow 901 \\ \text{comment: predicts BS } j\text{'s reaction to BS } i\text{'s strategy} \\ A_i^* \leftarrow \operatorname{argmax}_{A_i} \{U_i[A_i, A_j^{A_i}]\} & \text{(ii)} \longrightarrow 902 \\ \text{comment: BS } i \text{ determines its action from prediction of BS } j\text{'s reaction} \end{cases}$ for BS $j$:

do $A_j^* \leftarrow \operatorname{argmax}_{A_j}\{U_j[A_i^*, A_j]\}$     (iii) ⟶ 903 comment: BS $j$ makes decision upon observation of $A_i^*$ output (utility pair$\{U_i[A_i^*, A_j^*], U_j[A_i^*, A_j^*]\}$)

*Figure 9*

CONTINUOUS STACKELBERG DECISION MAKING $(r, C_1, C_2, \sigma_{t,r})$ comment: Sequential leader-follower decision making between BS and MS.

initialization: The values of $r$, $C_1$, $C_2$ and $\sigma_{t,r}$ are determined.

for the leader (BS) :

do
$\quad \begin{cases} e^* \leftarrow \arg\max_{e \in \mathfrak{R}^+} U_{\text{MS}}(e, R_r) = g_1(R_r); \quad \text{(i)} \quad \text{—1301} \\ \quad \textbf{comment:} \text{ predicts MS's optimal } \textit{response} \ (e^* = g_1(R_r)) \text{ to BS's decision } R_r. \\ U^*_{\text{BS}}(R_r) = U_{\text{BS}}(R_r, e)|_{e=e^*=g_1(R_r)} = U_{\text{BS}}(R_r, g_1(R_r)); \quad \text{(ii)} \quad \text{—1302} \\ \quad \textbf{comment:} \text{ BS models its utility as a single-variable function of } R_r \text{ by plugging} \\ \quad \quad \text{in the optimal response from MS.} \\ R^*_r \leftarrow \arg\max_{R_r \in \mathfrak{R}^+} U^*_{\text{BS}}(R_r); \quad \text{(iii)} \quad \text{—1303} \\ \quad \textbf{comment:} \text{ BS determines its decision that maximize its own utility.} \end{cases}$ for the follower (MS) :

do $\quad e^* \leftarrow \arg\max_{e \in \mathfrak{R}^+} U_{\text{MS}}(e, R^*_r);$ (iv) —1304

$\quad$ comment: MS makes decision upon observation of the decision $R^*_r$ from BS.

output (utility pair $\{U_{\text{BS}}(e^*, R^*_r), U_{\text{MS}}(e^*, R^*_r)\}$).

*Figure 13*

METHOD FOR REDUCING INTER-CELL INTERFERENCE IN WIRELESS OFDMA NETWORKS

FIELD OF THE INVENTION

This invention relates generally to managing interference in wireless networks, and more particularly to reducing inter-cell interference in wireless orthogonal frequency division multiplexing (OFDM) networks.

BACKGROUND OF THE INVENTION

OFDM, OFDMA and SC-FDMA

In orthogonal frequency-division multiplexing (OFDM), the available radio frequency (RF) spectrum is partitioned into subcarriers that are orthogonal to each other. Due to the appealing features of OFDM technologies, such as its spectrum efficiency, easy implementation using fast Fourier transformation (FFT) and effectiveness in mitigating multipart effects, OFDM is widely used in the design of the physical layer (PHY) of networks.

In orthogonal frequency-division multiple access (OFDMA), the subcarriers are grouped into sets and allocated to different mobile stations for parallel transceiving. OFDMA has been adopted in a wide variety of standards for broadband wireless communications, such as the IEEE 802.16e for both uplink and downlink, and 3GFP-LTE for downlink.

The basic uplink (UL) transmission scheme in 3GPP LTE uses a single-carrier FDMA (SC-FDMA) with cyclic prefix (CP) to achieve uplink inter-user orthogonality and to enable efficient frequency-domain equalization at the receiver side. This allows for a relatively high degree of commonality with the downlink OFDM scheme such that the same parameters, e.g., clock frequency, can be used.

Network Structure

In wireless OFDMA networks, a base station at the approximate center of a cell communicates with mobile stations in its area of coverage. When mobile station exits a cell, it handed over to an adjacent base station. Base stations in the network exchange information with each other via a backbone or infrastructure.

Inter-Cell Interference

When geographically adjacent base stations allocate the same spectrum, inter-cell interference affects network throughput, especially for the mobile stations (MSs) within range of more than one base station. This interference also increases power consumption because colliding messages have to be retransmitted.

Two techniques are commonly used for reducing inter-cell interference due to subcarrier collision. One technique uses random subcarrier allocation to decrease the probability that the mobile stations in the adjacent cells are allocated the same subcarriers.

The other technique uses cooperative subcarrier allocation. This requires that the base stations exchange all subcarrier allocation information, even for mobile stations not subject to inter-cell interference. This also requires that all subcarriers are available in both cells at the time the subcarriers are allocated, which is usually impossible to schedule in practice.

Game Theory

Game theory is a branch of applied mathematics widely applied in economics and the study of behaviors of entities that are able to make rational decisions. In game theory, the process of interactive decision making is modeled as a game. The idea is to maximize one's payoff. The outcomes of the game are usually represented by numbers known as utilities. The utilities represent levels of satisfaction with the outcome, i.e., the payoff.

The Nash Equilibrium in a game is a stable operation point at which no player of the game can achieve a higher utility by deviating alone from the current strategy. That is, when the strategies of other players are fixed, any single player of the game achieves best payoff when the player stays with the strategy selected at the Nash Equilibrium.

Cognitive Sensing

Cognitive sensing is used in wireless networks to learn transmission or reception parameters so that transceivers can communicate efficiently without each other without interfering with other licensed or unlicensed transceivers. Cognitive sensing is based on an active monitoring of several factors in tire external and internal radio environment, such as the radio frequency spectrum, and transceiver and network state.

SUMMARY OF THE INVENTION

The invention adaptively reduces subcarrier collisions in OFDMA wireless networks. The embodiments of the invention identify mobile stations (MSs) that are subject to inter-cell interference.

The base can acquire information about subcarrier allocation from the handoff protocol. Although the BSs communicate with each other via the infrastructure, no pre-determined action is enforced on the BS, thereby avoiding non-adaptive subcarrier allocation.

The MSs can also acquire this information using cognitive sensing. Cognitive sensing can be rewarded by the BS. The reward gives the MSs an incentive to perform the otherwise power consumptive cognitive sensing.

Using this information, subcarriers can be allocated randomly, with blind optimization, or by joint optimization. The stations can use game theory to select among the three different strategies. The embodiments also identify how to determine the periodicity for which the interference information are acquired in an optimum manner, for different traffic types such as voice and data traffic and to optimize for different types of scheduling of a radio resource.

BRIEF DESCRIPTION OF THE DRAWINGS

FIG. 9 is pseudo code for Stackelberg leader-follower game played between two base stations according to an embodiment of the invention;

FIG. 13 is pseudo code of a Stackelberg leader-follower game played between the MS and BS to facilitate cognitive sensing according to an embodiment of the invention;

DETAILED DESCRIPTION OF THE PREFERRED EMBODIMENTS

Network Topology

Figure 1:
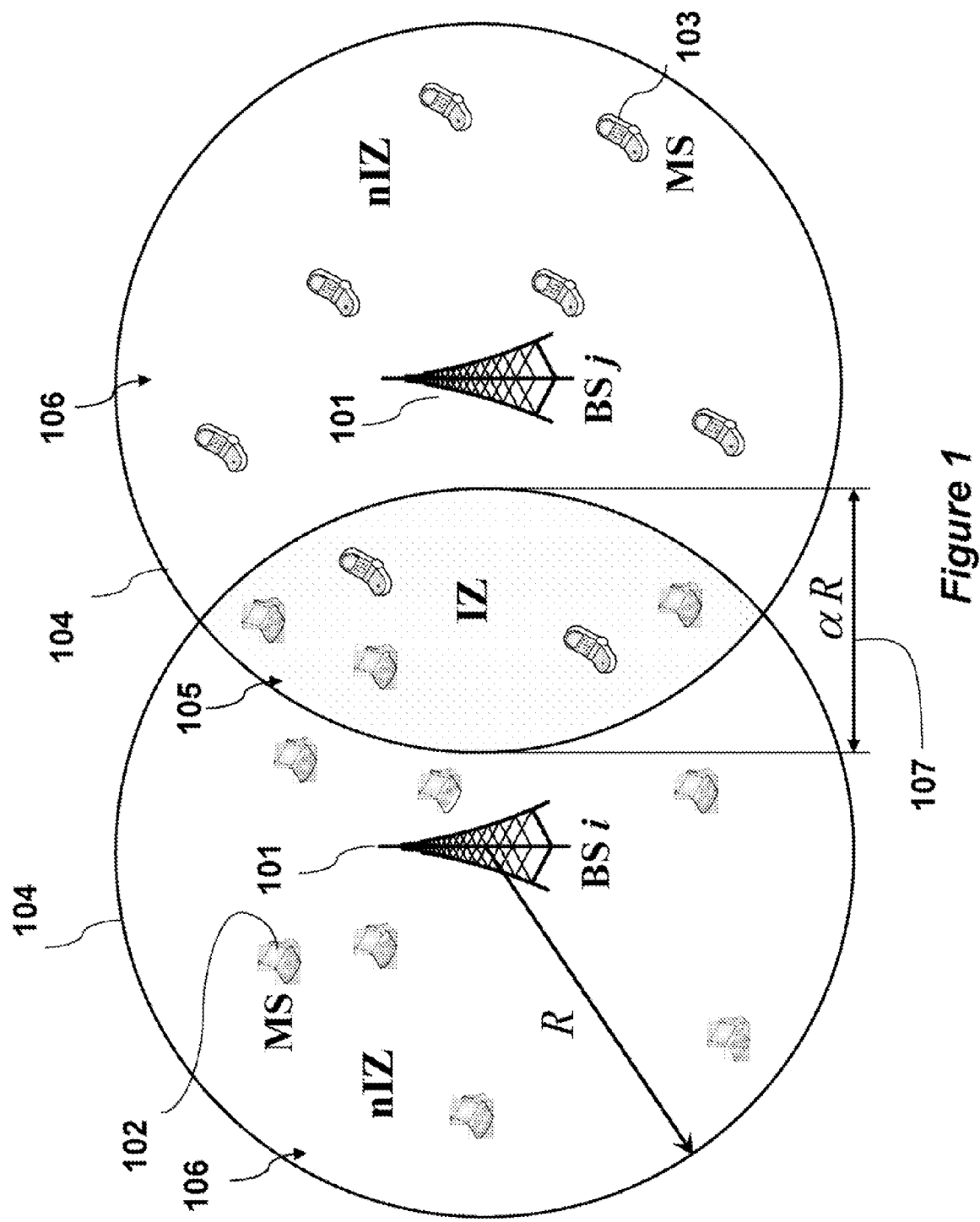
FIG. 1 is a schematic of a wireless network used by embodiments of the invention.

FIG. 1 shows a wireless OFDMA network according to an embodiment of our invention. The network includes base stations 101, and mobile stations 102-103. The circles 104 approximate the range (R) of the base stations. The coverage area within the range is called a cell. The base stations allocate the subcarriers within its cells. It is understood that in real world networks, the cells need not be circular, and the coverage area may depend on antenna configurations and environmental conditions. We use circles only as a reasonable approximation.

Mobile stations in a segment where cells intersect can be subject to inter-cell interference. The two cells have an overlapping radius of aR 107. That is, the distance between the two base stations is $2R-\alpha R$, where a is some constant dependent on the geographic placement of the base stations.

Frequency Reuse

The process for allocating spectrum among adjacent cells is called frequency reuse. When the network allocates the identical spectrum to adjacent cells, the frequency reuse factor is 1.

Traffic Load

Traffic load $\beta$ is the ratio of used subcarriers S to total available subcarriers N, i.e., $\beta_i = N_i/S$. We consider the cases when the traffic load is $\beta_i \in [0,1]$.

Interference Zone

The interference zone (IZ) 105 is where inter-cell interference or subcarrier collisions can occur. The rest of the coverage area is the non-interference zone (nIZ) 106. In the IZ, the MSs served by BS i belong to the set $\Gamma_i$, and the MSs served by BS j belong to the set $\Gamma_j$. The MSs in the set $\Gamma_i$ are subject to inter-cell interference when the same subcarriers are allocated by BS j to the MSs in the set $\Gamma_j$, and vice versa.

In the example network, the fractional area of the IZ 105, with respect to the total cell coverage is $$f(\alpha) = |A_{IZ}(\alpha, R)| / (\pi R^2) \qquad (1)$$

$$= \frac{2}{\pi} \cdot \left[\arccos\left(1 - \frac{\alpha}{2}\right) - \left(1 - \frac{\alpha}{2}\right)\sqrt{4\alpha - \alpha^2}\right].$$

A size and a contour of the interference zone is a function of a handoff threshold value as well as a RF propagation environment.

Non-Interference Zone

The MSs in the nIZ 106 belong to sets $\Gamma_i^C$ and $\Gamma_j^C$.

Co-Channel Interference Management for OFDMA System

When the reuse factor is 1, the same spectrum in adjacent cells is partitioned into the S orthogonal subcarriers. These subcarriers are allocated to different MSs using OFDMA. Interference management according to the embodiments of the invention allocates different subcarrier to the MSs in the sets $\Gamma_i$ and $\Gamma_j$.

Distribution of the MSs in the Cells

If the MSs are uniformly distributed in the cells, then the locations of the MSs can be modeled by a two-dimensional Poisson point process, which has a density $\lambda_1 = M_1/(\pi R^2)$, where $M_1$ is the total number of MSs in the cell, and R is the radius of the cell. It should be understood that the invention can also be worked with non-uniform distributions of MSs.

Identifying MSs in IZ with Handoff

Figure 2:
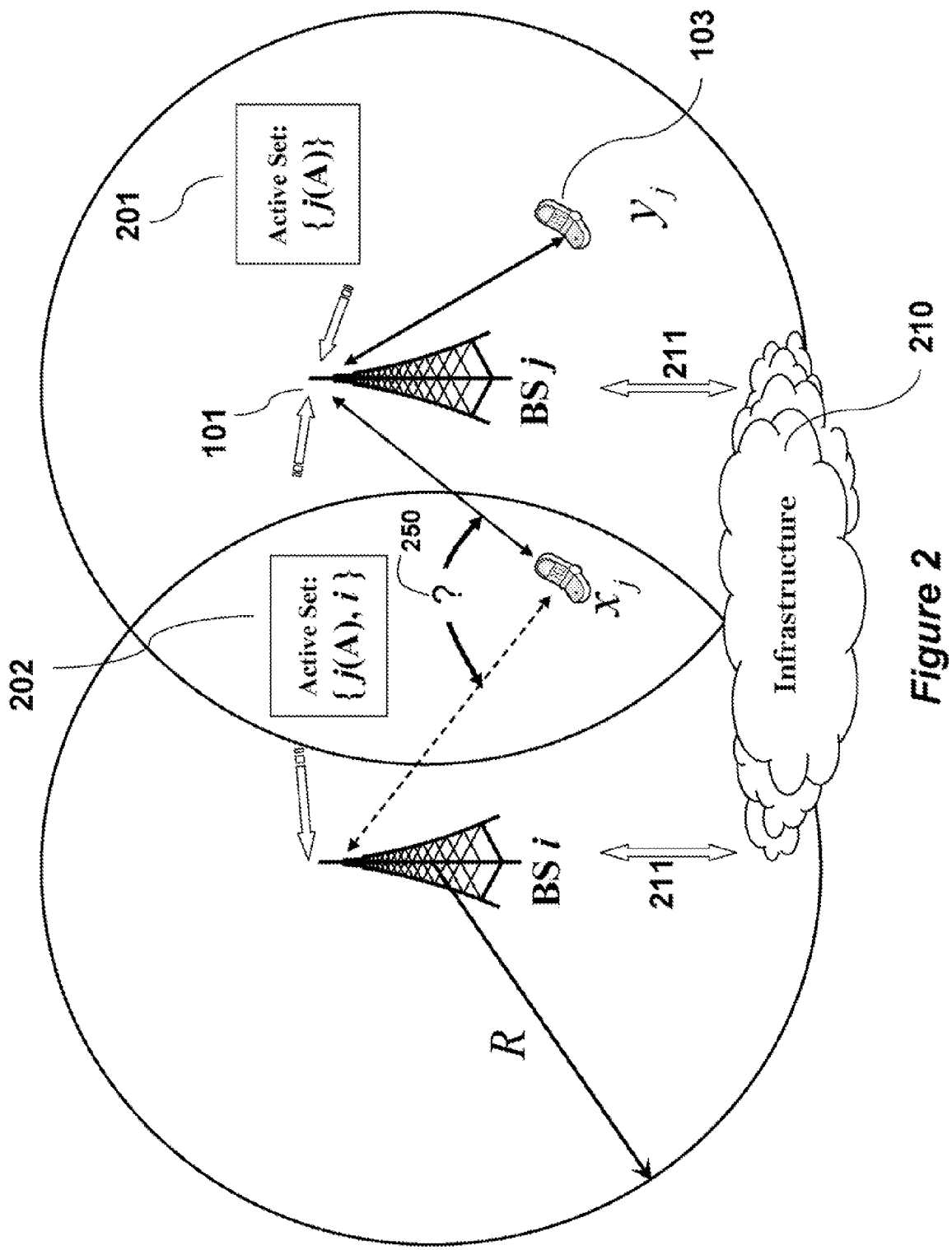
FIG. 2 is a schematic of the network of FIG. 1 using an infrastructure and handoff information to identify interferers according to an embodiment of the invention.

As shown in FIG. 2, mobile networks typically perform a handoff 250 to transfer a mobile station from cell to another. A number of handover techniques are known. To perform the handoff, the MSs can maintain active sets 201-202. Handoff thresholds $H_{Add}$ and $H_{Delete}$ determine whether or not to add a BS to the active set. If the carrier to interference-plus-noise ratio (CINR) of the BS is less than the delete handoff threshold $H_{Delete}$, the MS deletes the BS from the active set. If the CINR is above the add handoff threshold $H_{Add}$, then the BS adds the base station to the active set. The BS currently serving the MS is the anchor BS in the active set.

In addition, the above handoff threshold values can be decreased to include subcarriers or blocks of subcarriers, which do not have a large CINR but which do have sufficient power to cause interference. Typically, these "modified handoff thresholds", called interference thresholds, are 10 or more dB less than the normal handoff thresholds described above. These interference threshold values are not used for handoff purpose. Instead the interference thresholds provide information of occupied spectrum for interference management as described herein.

In other words, the invention takes advantage of the conventional handoff protocol to convey the information of occupied channels and spectrum. The interference threshold values are values that can be modified according to system requirement and used to define whether a carrier, channel or spectrum is occupied. The determination of the interference threshold values also defines the degree of tolerance or immunity to a RF interference in the same carrier, channel or spectrum. For the purpose of simplicity, hereon, any mention of handoff or handoff information would implicitly include the use of the handoff information for setting the interference threshold values.

In FIG. 2, the MS $x_j$ is located in the IZ 105 and is served by the BS j. Therefore, the active set for the MS $x_j$ is $\{j/(A), i\}$ 202, and the BS j is marked as the anchor (A). If the active is sent to the BS, then the BS can determine whether the MS is located in the IZ, or not. For the example in FIG. 2, the BS j can determine that the MS $x_j$ is in the IZ because the active set includes BS i. The BS j can also determine that MS $y_j$ is in the nIZ because that active set is $\{j(A)\}$ 201, which only includes the anchor BS j.

We use the handoff information 201-203 to reduce inter-cell interference according to an embodiment of the invention.

Information Gathering with Partial Information Exchange

Information Exchange Between BSs.

The BSs can exchange the above information via a backbone or infrastructure 210 of FIG. 2. In a joint subcarrier optimization process described below, the BSs exchange all subcarrier usage information 211. In random allocation, no subcarrier usage information is exchanged between BSs. In the embodiment of this invention, partial subcarrier usage information is exchanged.

Figure 3:
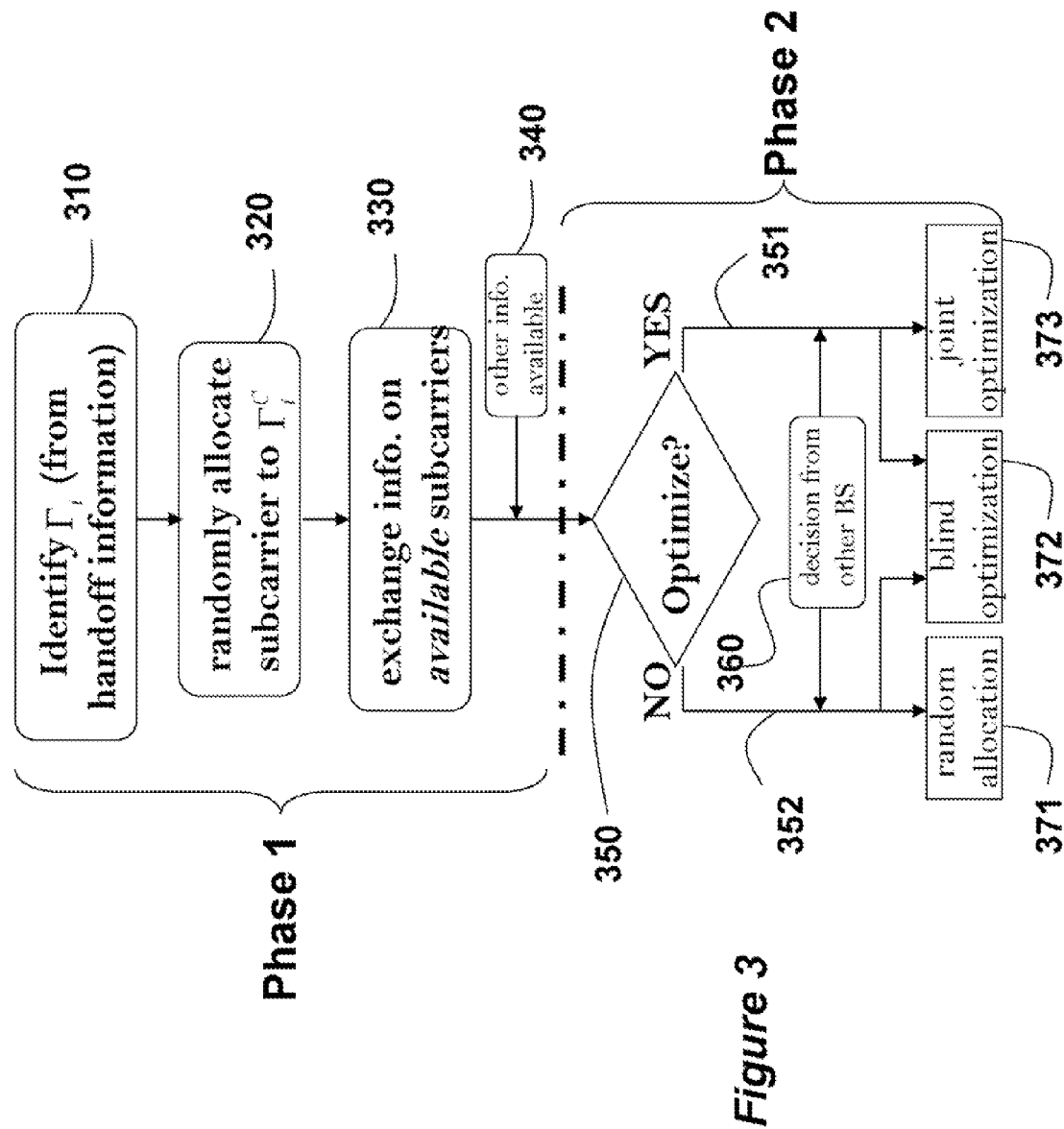
FIG. 3 is a flowchart of a method for reducing inter-cell interference according to an embodiment of the invention.

Operational Scheme for Interference Avoidance with Partial Subcarrier Information Exchange FIG. 3 shows a method for managing inter-cell interference according to an embodiment of our invention. In phase 1, the two BSs identify 310 the MSs located in the IZ 105 and the IZ 106 from the handoff information, as described above. Upon identifying the MSs in the IZ 105. Each BS randomly allocates 320 subcarriers to the MSs in the nIZ 106, i.e., the MSs in sets $\Gamma_i^C$ and $\Gamma_j^C$. Then, the BSs exchange 330 information 211 on subcarriers that are still available via the infrastructure. During the exchange, the set of available subcarriers $N_i^A$ in cell i is communicated to the BS j, and the set $N_j^A$ is communicated to the BS i. Other information, e.g., a historical record of subcarrier usage, if available, can also be exchanged.

During the phase 2, each base station can select 350 to optimize 351 or not to optimize 352. The subsequent steps are random allocation 371, blind optimization 372 or joint optimization 373 can be based on the decision 360 of the other BS.

No Optimization

If both BSs select not 352 to optimize, then the exchanged information 211 is not used, and both BSs use random allocation 371 of the available subcarriers.

In this case, the expected number of subcarrier collision is $$E[C_R] = f^2(\alpha)\beta_i\beta_j S, \quad (2)$$

where f represents the frequencies of the subcarriers.

This indicates even when the traffic loads $\beta$ in both cells are relatively light, the number of subcarrier collisions is significant and linearly proportional to the traffic load in each cell.

Blind Optimization

Figure 4:
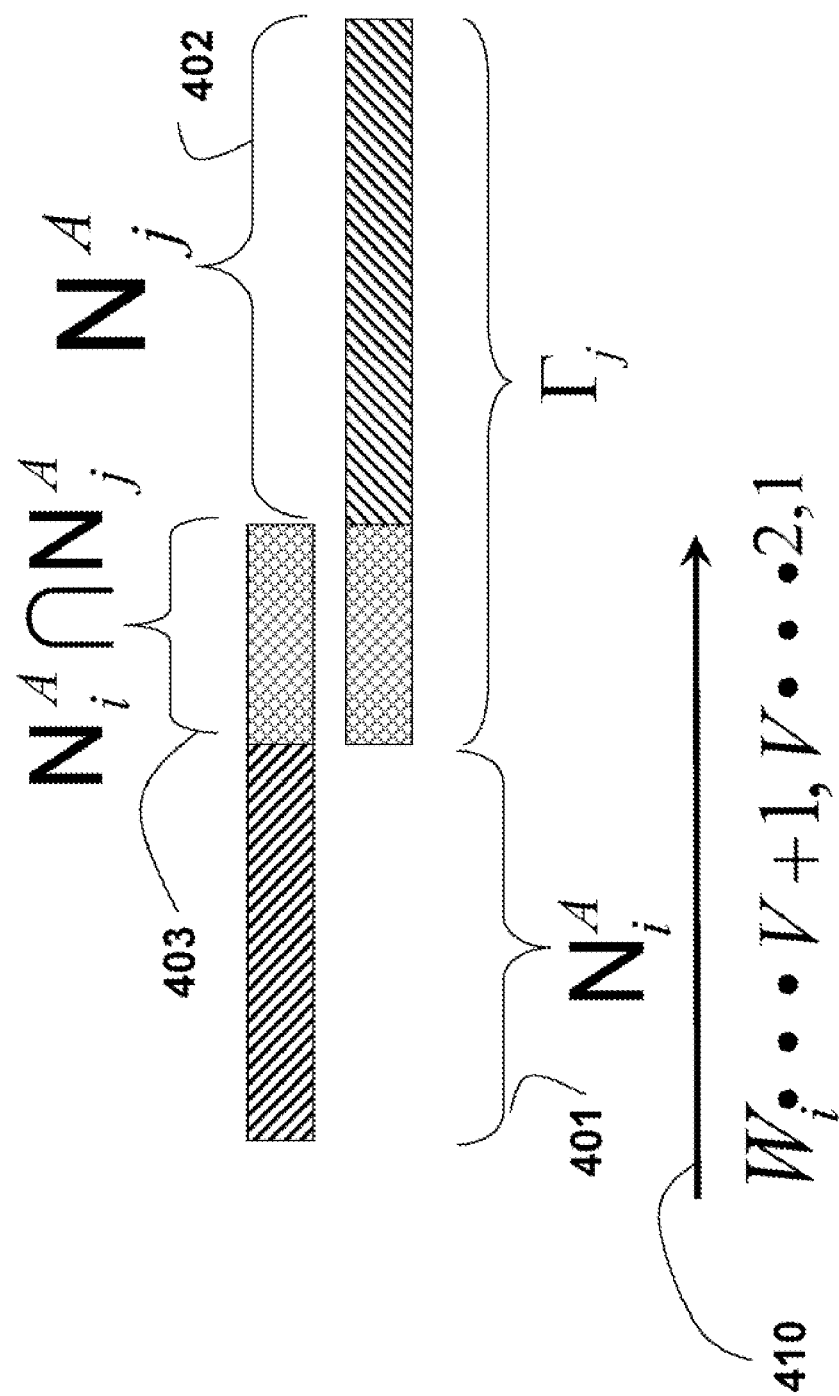
FIGS. 4-5 are block diagrams of subcarrier allocation using blind optimization according: to an embodiment of the invention.

FIG. 4 shows the blind optimization 372 schematically. When the BS i selects optimization 351 while the BS j does not 352, the BS i performs 'blind' optimization. In blind optimization, the BS i does not know the exact subcarrier allocation to the set $\Gamma_j$ of the other BS. However, the BS i does have the available subcarriers in the cell j, i.e., $N_j^A$, after the subcarrier information exchange. Therefore, the BS i can identity the intersection of the subcarrier set 403 of $N_i^A$ 401 and $N_j^A$ 402.

To reduce subcarrier collisions, the BS i performs the blind optimization by allocating the subcarriers outside the intersection $N_i^A \cap H_j^A$ first. For example, BS i can logically-number the subcarriers in $N_i^A$ such that the subcarriers in the intersection $N_i^A \cap N_j^A$ are labeled logically as 1, 2, 3 ... $V_i$, where $V_i = |N_i^A \cap N_j^A|$ is the size of the subcarrier intersection. The ordering within $N_i^A \cap N_j^A$ can be selected arbitrarily. The subcarriers in $N_i^A \setminus (N_i^A \cap N_j^A)$ are labeled logically as $V_i+1$, $V_i+1, \ldots W_i$, where $W_i = |N_i^A|$ is the total number of available subcarriers in cell i. With the random subcarrier allocation to the set $\Gamma_i$, the base station selects the subcarriers using the reverse order 410, i.e., the subcarriers with higher logical numbers are selected first. In this way, the non-overlapping subcarriers, i.e., the subcarriers that are not subject to possible collisions, are used first, and subcarrier collision is reduced.

Nevertheless, when the number of subcarriers needed by the MSs in the set $\Gamma_i$ is larger than $W_i - V_i$, the subcarriers in the intersection $N_i^A \cap N_j^A$ need to be used, which are subject to possible subcarrier collisions.

Figure 5:
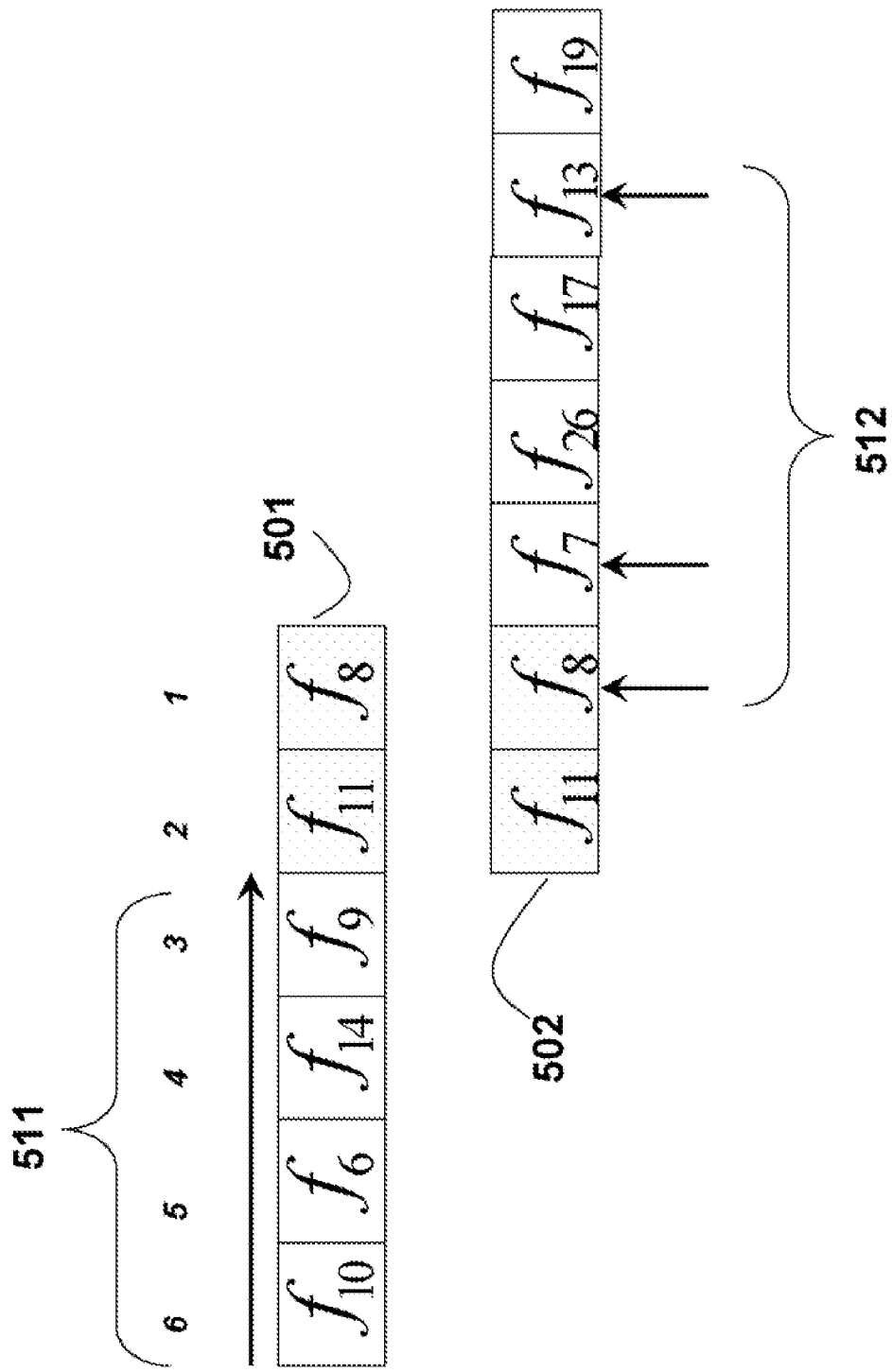

FIG. 5 shows an example of blind optimization where the BS i is performing blind optimization, while the BS j randomly allocate available subcarriers to MSs in the set $\Gamma_j$. After the random subcarrier allocation to the MSs in the nIZ 105, the set of available subcarriers in cell i is $N_i^A = \{f_{10}, f_6, f_{14}, f_9, f_{11}, f_8\}$ 501, and the set of available subcarriers in cell j is $N_j^A = \{f_{19}, f_{13}, f_{17}, f_{26}, f_7, f_{11}, f_8\}$ 502.

The MSs in the set $\Gamma_i$ need four subcarriers 511, while the MSs in the set $\Gamma_j$ need three subcarriers 512. In this example, the BS i determines that $N_i^A \cap N_j^A = \{f_{11}, f_8\}$. Therefore, the BS labels the subcarrier $f_8$ and $f_{11}$ with the lowest logical numbers, and the remaining available subcarriers are labeled by logical label 3, 4, 5, 6.

In the process of allocating subcarriers, the BS prioritizes the use of the subcarriers with higher logical labels. Therefore, because four subcarriers 511 are needed, BS i allocates the subcarriers $\{f_{10}, f_6, f_{14}, f_9\}$ for usage in the set $\Gamma_i$. The three subcarriers 512 allocated to MSs in the set $\Gamma_j$ are randomly selected. The BS j allocates subcarrier $\{f_7, f_8, f_{13}\}$ to MSs in the set $\Gamma_j$. Although the subcarrier usage in the set $\Gamma_j$ includes the subcarrier $f_8 \in N_i^A \cap N_j^A$, subcarrier collision is still reduced due to the blind optimization performed by BS i.

The expected number of subcarrier collisions using blind optimization performed by BS i is $$E[C_B] = M \cdot \frac{\beta_i f(\alpha)}{(1-\beta_j) + \beta_i f(\alpha)}, \quad (3)$$

where $M = I_p(d+1, n_B-d) \cdot I_p(d, n_B-d)E[V] - dI_p^2(d+1, n_B-d)$, in which $$I_p(a, b) = \frac{\int_0^\infty t^{a-1}/(1+t)^{a+b}\,dt}{\int_0^1 t^{a-1}/(1-t)^{b-1}\,dt}, \quad \forall \{a, b\} \geq 0$$

is a regularize beta function, and the other parameters are $E[V] = n_B p_B$ $n_B = [f(\alpha)\beta_j + (1-\beta_j)]S$ $p_B = f(\alpha)\beta_i + (1-\beta_i)$ $d = S(1-\beta_i) \quad (4)$ The expected number of subcarrier collisions for blind optimization 372 is always smaller than the number of collisions due to random allocation 371, i.e., $E[C_B] \leq E[C_R], \forall \{\beta_i, \beta_j\} \in [0,1]$ and $\alpha \in [0,2]$.

When the traffic load is relatively light, the expected number of subcarrier collision is significantly lower with the blind optimization. For example, when the traffic load in both cells is smaller than 0.5, the expected number of subcarrier collisions approaches zero.

The effectiveness of the blind optimization depends on the traffic loads in both cells as well as the number of subcarriers required by MSs in the IZ. When the BS i performs the blind optimization, the expected number of subcarrier collisions monotonically decreases with $\beta_i$. However, lower traffic load in cell j may not necessarily reduce the expected number of subcarrier collisions. This is because as $\beta_j$ decreases, the number of subcarriers that can potentially cause interferences to the MSs in the set $\Gamma_i^C$ is reduced.

However, lighter traffic also means that $N_i^A \cap N_j^A$ is a larger set, which has negative impact on the effectiveness of blind optimization. Therefore, the impact of lighter traffic has to be considered to determine whether a smaller $\beta_j$ results in more effective blind optimization. Additionally, because a subcarrier collision is mutual and is equally undesirable to both the BSs, any effort to reduce subcarrier collision in one BS is beneficial to both BSs.

Joint Optimization

Figure 6:
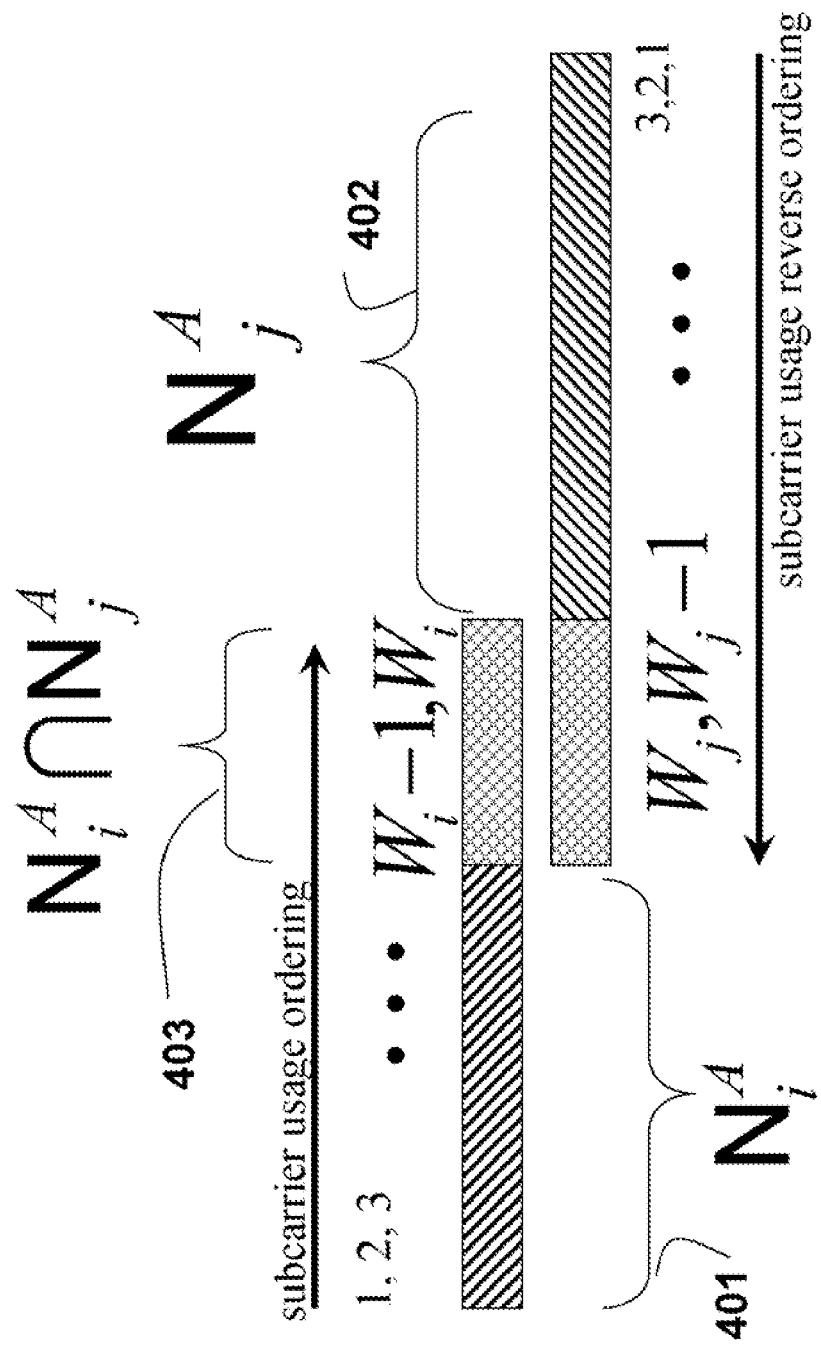
FIGS. 6-7 are a block diagrams of subcarrier allocation using joint optimization according to an embodiment of the invention.

FIG. 6 shows the joint optimization 373 after the exchange of subcarrier information $N_i^A$ and $N_j^A$. Both the BSs identify the set $N_i^A \cap N_j^A$ 403, and both BSs logically-number the available subcarriers such that the V overlapping available subcarriers are respectively ordered $W_i$, $W_i-1 \ldots, W_i-V+1$ and $W_j$, $W_j-1 \ldots, W_j-V+1$, see FIG. 6. The exact ordering within $N_i^A \cap N_j^A$ is irrelevant.

With the joint optimization, minimum subcarrier collision can be achieved given that the subcarrier usage in the nIZ is randomly selected. That is, after subcarriers are allocated randomly in the nIZ, the joint optimization first allocates the non-overlapping subcarriers in $N_i^A$ to MSs in the set $\Gamma_i$, and the non-overlapping subcarriers in the $N_j^A$ to MSs first in the set $\Gamma_j$. Both BSs do not allocate subcarriers in $N_i^A \cap N_j^A$, unless absolutely necessary. In this way, when only partial information on the subcarrier usage is exchanged, both BSs make a best effort to avoid interference in the IZ, and can further reduce the expected number of subcarrier collisions.

Figure 7:
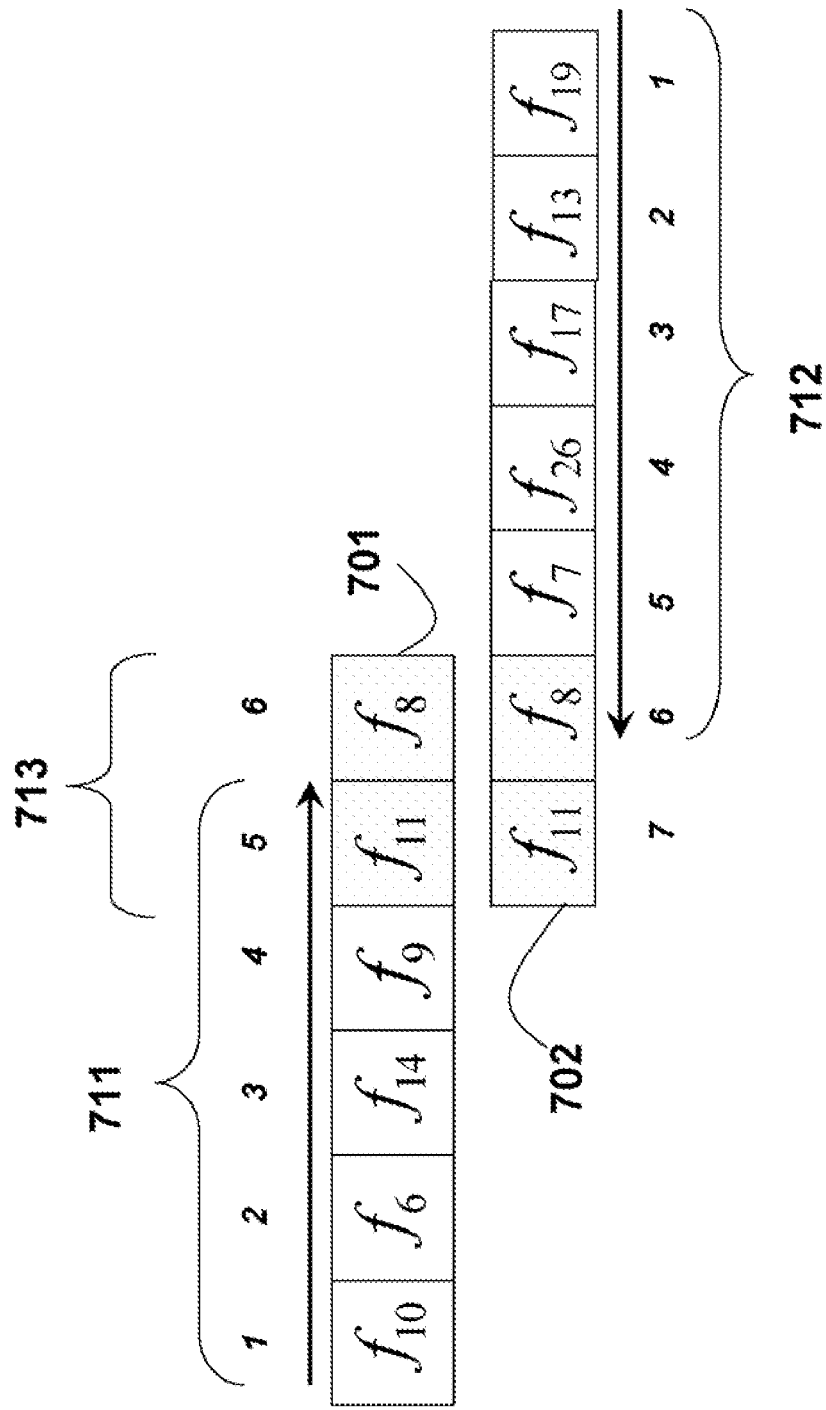

FIG. 7 shows an example of the joint optimization. After the random subcarrier allocation to the MSs in the nIZ, the set of available subcarriers in the cell i is $N_i^A = \{f_{10}, f_6, f_{14}, f_9, f_{11}, f_8\}$ 701, and the set of available subcarriers in cell j is $N_j^A = \{f_{19}, f_{13}, f_{17}, f_{26}, f_7, f_{11}, f_8\}$ 702. The MSs in the set $\Gamma_i$ needs five subcarriers 711, while the MSs in $\Gamma_j$ needs six subcarriers 712. In this case, both the BS i and the BS j identify the intersection $N_i^A \cap N_j^A = \{f_{11}, f_8\}$ 713 of the available subcarrier sets in the two cells. Therefore, both the BS i and BS j label the subcarrier $f_8$ and $f_{11}$ with the highest logical numbers, specifically, $f_8$ and $f_{11}$ are logically labeled 6 and 5 respectively BS i, while $f_{11}$ and $f_8$ are logically labeled as 7 and 6 by BS j. The rest of the available subcarriers are logically labeled beginning at 1.

In the process of allocating subcarriers, both the BSs prioritize the use of the subcarriers with lower logical labels. Therefore, because five subcarriers are needed, BS i allocates the subcarriers $\{f_{10}, f_6, f_{14}, f_9, f_{11}\}$ for usage in $\Gamma_i$, and BS j allocates six 6 subcarriers $\{f_{19}, f_{13}, f_{17}, f_{26}, f_7, f_8\}$ to MSs in $\Gamma_j$. The subcarrier usage in the set $\Gamma_i$ includes subcarrier $f_{11} \in N_i^A \cap N_j^A$ and the subcarrier usage in $\Gamma_j$ includes subcarrier $f_8 \in N_i^A \cap N_j^a$. However, subcarrier collision is avoided because both BSs engage in the joint optimization.

When joint optimization is perform, the expected number of subcarrier collision is $$E[C_J] = I_p(d'+1,\gamma_J) \cdot I_p(d',\gamma_J) E[V] - d' I_p^2(d'+1,\gamma_J) \quad (5)$$

in which $d' = S(2-\beta_i-\beta_j)$ and $\gamma_J = \max(0, n_B - d')$. It can be shown that $E[C_J] \leq E[C_B] \leq E[C_R], \forall \{\beta_i, \beta_j\} \in [0,1]$ and $\alpha \in [0,2]$, which, indicates a reduction in subcarrier collisions when compared to the blind optimization. Equation (5) indicates that when the traffic load in both cells is smaller than 0.8, the joint optimization can avoid almost all subcarrier collisions.

Interactive Decision Making

The random allocation, blind optimization and joint optimization are enabled by interactions between the BSs, and cannot be solely determined by one BSs. For example, if BS i selects to optimize, the outcome cannot be determined until BS j has made a specific decision. If BS j does not optimize, then the outcome is blind optimization 372 by BS i. If BS j decides to optimize too, the outcome is joint optimization 373.

Because the decision depends on the interaction of two entities, i.e., the base stations, game theory can be used to maximize the payback, i.e., network performance.

Strategic Game

Figure 8:
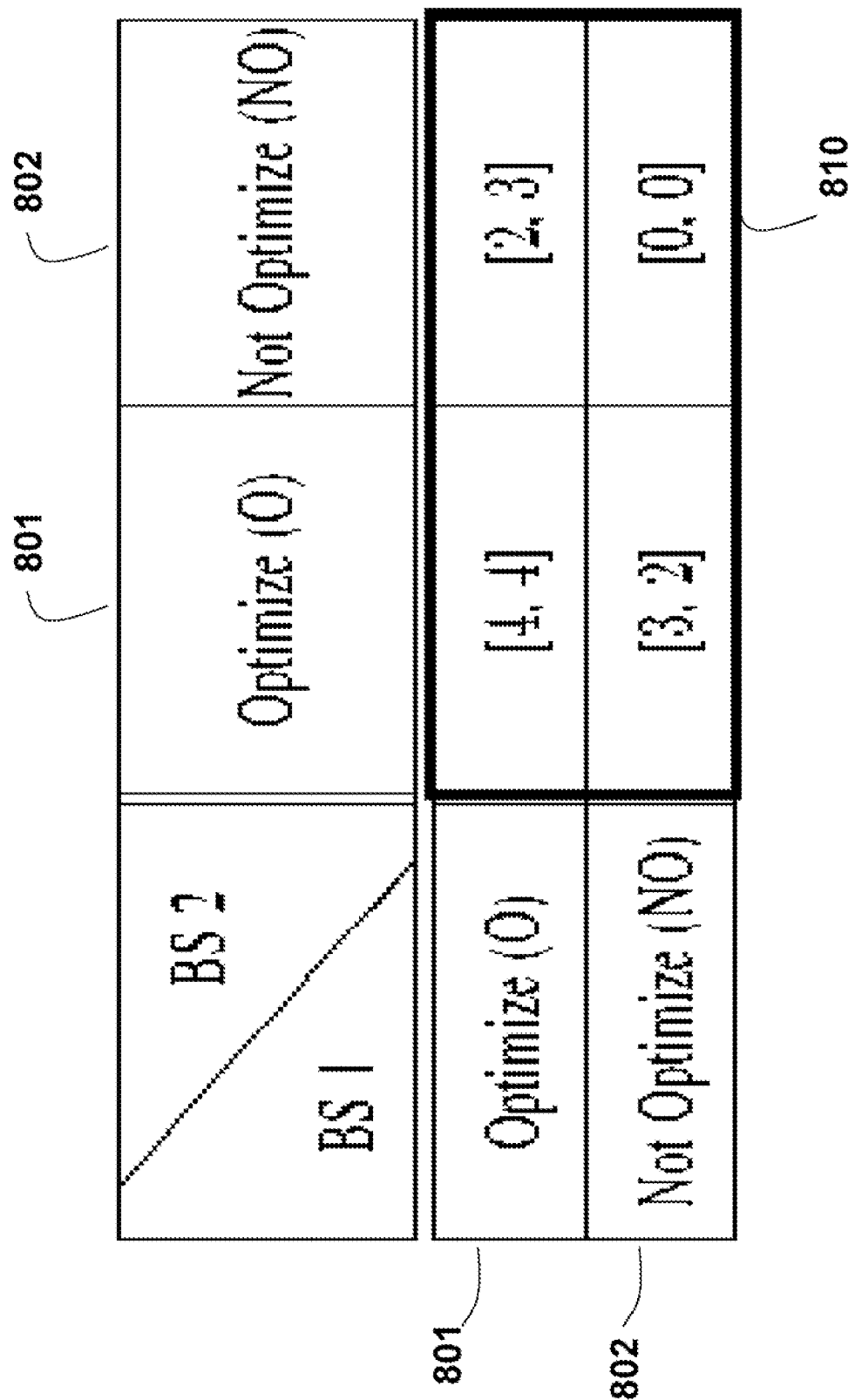
FIG. 8 is a table of outcomes a two-player strategic game for allocating subcarriers according to an embodiment of the invention.

FIG. 8 shows the outcomes of a strategic game according to an embodiment of the invention. The two players are BS 1 and BS 2. This makes our game base station centric. As described below, the game can also be mobile station centric. Both players can select their action from the binary strategy space {O, NO}, where O stands for "Optimize" 801 and NO means "Not Optimize" 802. The action of BS 1 changes row-wisely and the action of BS 2 changes column-wisely. Different pairs of the actions taken by the two players result in different outcomes of the game, which are associated with different utilities (payoffs) to the two players.

An outcome of the game can be presented by a two dimensional vector $\overline{X}$ and there are four possible game's outcomes 410 shown in Table 1.

TABLE 1

| Outcome $\overline{X}$ = {action 1, action 2} | Descriptions |
| --- | --- |
| {O, O} | Both players coordinate in optimization to result in joint optimization. |
| {NO, O} | Player 2 optimizes while player 1 does not to result in blind optimization performed by player 2 and player 1 gets a 'free ride'*. |
| {O, NO} | Player 1 optimizes while player 2 does not to result in blind optimization performed by player 1 and player 2 get a free-ride. |
| {NO, NO} | Neither of the players optimizes to result in random allocation. |

*In game theory, a free ride is gaining a benefit without the ordinary effort or cost.

Utility of a strategy is presented by a real number, a higher value of utility corresponds to a higher level of satisfaction the player has about the outcome. The utilities of the two players in FIG. 8 are written in the format of [Utility of Player 1, Utility of Player 2]. For example, the pair {O,O} results in the outcome of joint optimization, in this joint optimization, the players obtain utility [4,4].

Rational players try to maximize their utilities. The result of seeking maximal utilities by different players can result in a stable outcome in which all players achieve their maximum utilities, under the constraint that the actions of the other player are known. The Nash Equilibrium describes such a stable outcome, and is defined as the outcome in which no player can be better off by deviating alone from the outcome.

In FIG. 8, the only Nash Equilibrium is the strategy pair {O,O}. However, when the utilities associated with different outcomes change, the Nash Equilibrium of the strategic can also change. In some cases, there can by multiple Nash Equilibria in a game. The modeling of utilities is of vital importance to determine the stable outcome, i.e., Nash Equilibrium, of a game.

Modeling of the Utility Function

In the strategic game shown in FIG. 8, the utilities of players are given directly as real numbers. However, careful modeling is required to accurately represent the different utilities associated with different outcomes. In this invention, the utility of a strategy is defined as the value of a certain outcome to the player minus the cost required to achieve such outcome.

Most specifically, let $\theta$ be the expected number of subcarrier collisions and $\theta_{\overline{X}}^i$ be the expected number of subcarrier collisions in the set $\Gamma_i$ when the outcome is $\overline{X}$. The value of the outcome $\overline{X}$ to BS i can then be given as $\psi(\theta_{\overline{X}}^i)$, where $\psi(\theta)$ is a monotonically decreasing function of $\theta$, such that $$\frac{\partial \psi(\theta)}{\partial \theta} < 0,$$

because a rational BS prefers an outcome with reduced subcarrier collisions.

In addition, the process of optimization can be associated with a cost. Therefore, different outcomes are associated with different costs. The cost reflects the negative impact of performing optimization. For example, optimization may not be performed in real time. This can cause a delay in subcarrier allocation.

The cost incurred by the BS i to achieve the outcome $\overline{X}$ is a non-negative function $g_{\overline{X}}^i(\overline{X})$. The value of the function $g_{\overline{X}}^i(\overline{X})$ depends on the specific outcome $\overline{X}$, as well as the complexity of performing different types optimizations, e.g., joint optimization or blind optimization. The rule of thumb for modeling the cost function is that the cost is higher when the BS i is involved in joint optimization, compared to the case when the BS performs blind optimization. When random subcarrier allocation is selected by BS i, the cost is 0. Therefore, the utility of the BS i in outcome $\overline{X}$ is $$U_{\overline{X}}^i = \psi(\theta_{\overline{X}}^i) - g_{\overline{X}}^i(\overline{X}). \quad (6)$$

With this function, if the cost of performing optimization is higher, then the outcomes of the joint optimization and blind optimization are less likely. Conversely, if the payoffs increase more rapidly with the reduction in expected number of subcarrier collisions, i.e., even a small reduction in the number of collided subcarriers is viewed by the BS to be very valuable, then the outcome of joint optimization and/or blind optimization is more likely.

The functionality of the value function $\psi(\theta)$ and cost function $g_{\overline{X}}^i(\overline{X})$ reflects how the BSs evaluate the outcome and the cost of optimization. These functions can be chosen differently for different applications, under the general guidelines described above. As long as the function $\psi(\theta)$ is monotonically decreasing, and $g_{\overline{X}}^i(\overline{X})$ is non-negative, then the Nash Equilibrium can be found by the two BSs.

Stable Outcome from the Interactions Between BSs

The outcome of the game, e.g., the four different strategy pairs in FIG. 8 and Table 1 result from the interactions between two BSs. Neither of the two BSs can independently determine the outcome. We model the interactions between the two base stations as a binary Stackelberg leader-follower game. The Stackelberg leadership model is a strategic game where a leader decides first, and then the followers decide sequentially.

FIG. 9 shows the rules of this strategic game in the form of pseudo code. After exchanging the partial information on the available subcarriers, one BS i is the leader, while the other BS j is follower. The term leader does not indicate any superiority over the follower. Instead, the term strictly describes the order of sequential moves made by different players in the game. There are no guaranteed advantages or disadvantages associated with being a leader or a follower.

To maximize payoff (utility), the BS i first predicts the rational (optimal) response of the BS j to different actions of BS i (statement: (i) 901). In this way, the BS i can determines the different outcomes associated with its own different actions, under the rationality assumption of BS j. From these predicted outcomes, BS i can then select its own optimal decision that leads to the optimal outcome $A_i^*$ (statement (ii) 902).

After the BS i makes its decision, the BS j observes the action of the BS i. The BS j is now fully aware of the outcomes from different actions of its own, and if the BS j is rational, the BS i makes the optimal decision predicted earlier by the BS i (statement (iii) 902). This leads to the Nash Equilibrium in which the outcome is $[A_i^*, A_j^*]$. This rational decision, making is based on the utility modeled described above. The strategic game is adaptive to the different parameters of the system, e.g., the traffic load and a size of the interference zone.

Information Gathering Through MSs

Cognitive Sensing by MSs

When independent BSs do not communicate with each other and a MS cannot communicate directly with the BS of another cell, the information on possible interferers can only be gathered from other MSs. For example, the information collecting is initiated in cell i. The MSs in the set $\Gamma_i$ can perform cognitive sensing. In cognitive sensing generally, transceivers learn and adapt to the environment in which they operate, in one embodiment of the invention, possible interferers are identified.

Figure 10:
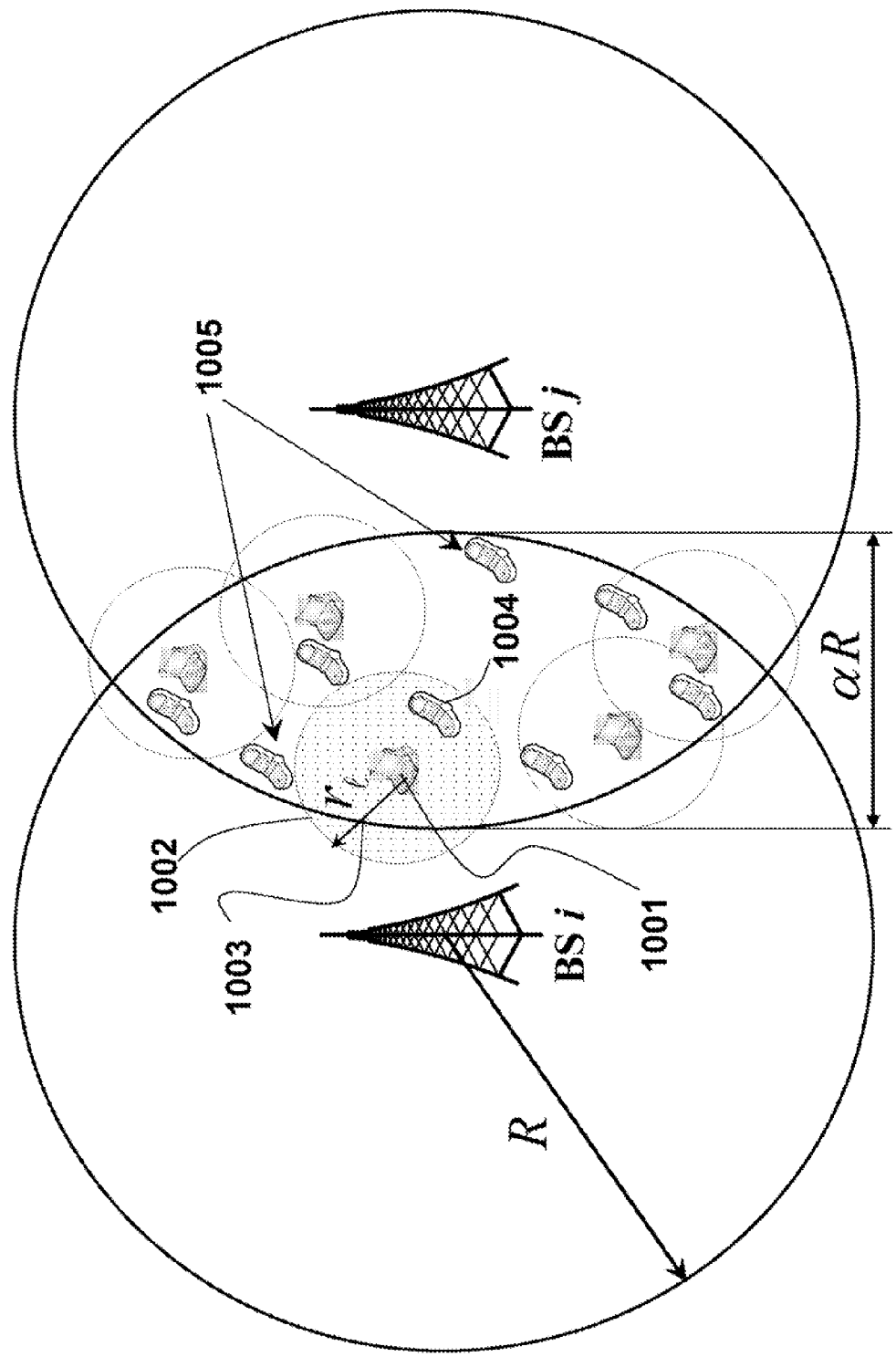
FIG. 10 is a schematic of cognitive sensing according to an embodiment of the invention.

FIG. 10 shows cognitive sensing of MSs according to an embodiment of the invention. To identify the possible interferers, a MS l 1001 in the set $\Gamma_i$ sends out a probing signal l, which covers a sensing region $A_l$ 1002 of radius $r_l$ 2003. If the MS 1004 in the set $\Gamma_j$ (active or inactive) is located in the region $A_l$, i.e., in the range of $r_l$ from MS l, The MS 1004 responds to the probing signal of l, and report the subcarrier(s) that it is currently using.

Spontaneous Reliable Response

If the MS in the set $\Gamma_i$ sends out the probing signal, all the MSs in the set $\Gamma_j$ that receive the probing signal respond to the probing request. This model is based on the rationale of mutual collision, i.e., a co-channel subcarrier collision is equally detrimental to all MSs involved. Therefore, whenever the MS in the set $\Gamma_j$ receives the probing, it reports its presence and subcarrier usage to facilitate the possible optimization performed by the BS i and avoid mutual subcarrier collisions. However, some MSs 1005 that are out of range of the probing signal may go undetected.

Completeness of the Collected Information by MSs

Figure 11:
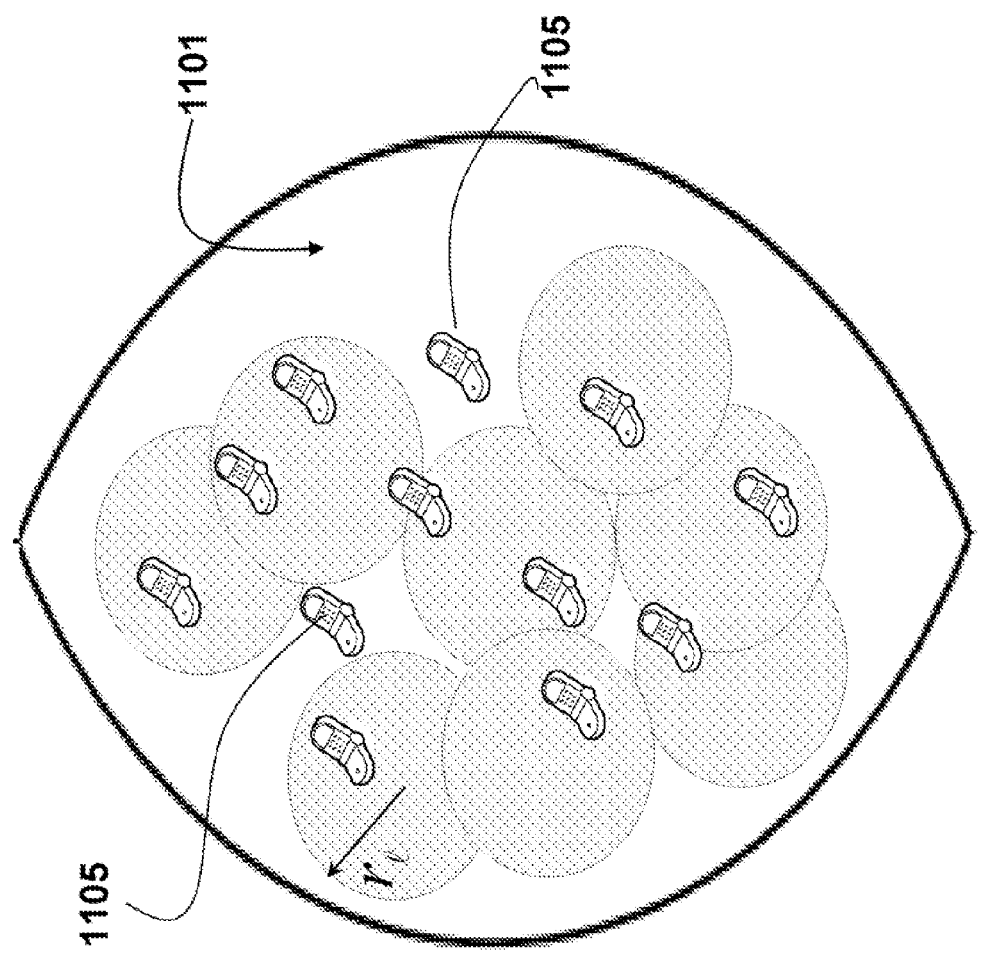
FIG. 11 is a schematic of coverage by the cognitive sensing according to an embodiment of the invention.

As shown in FIG. 11, the accuracy on the subcarrier usage acquired by BS i as a result of the cognitive sensing of MSs in the set $\Gamma_i$ depends on the fraction of area in the IZ that is covered by the cognitive sensing performed distributively at different MSs in the set $\Gamma_i$. The fraction of uncovered area 1101 corresponds to the fraction of blank region in FIG. 11. For example, if 80% of the IZ is covered by the cognitive sensing of some MSs in $\Gamma_i$, the BS i can acquire 80% of the subcarrier used by $\Gamma_j$ in IZ. In the example shown in FIG. 11, two MSs 1105 in the set $\Gamma_j$ are located in the blank region 1101 and do not fall within the sensing range of any MS in $\Gamma_j$. Therefore, the presence of these two MSs, and the subcarrier used by the two MSs cannot be collected and reported to the BS i.

With a uniform distribution of MSs, the completeness of the information collected on current subcarrier usage is equivalent to the fraction of area covered by the MSs in $\Gamma_i$. Because the interference is only possible within IZ, the completeness of the current subcarrier usage information is $$E[p_\mu] = \Upsilon_A = \frac{|(A_1 \cup A_2 \ldots \cup A_l \ldots) \cap A_{IZ}|}{|A_{IZ}|}, \quad (7)$$

where $A_{IZ}$ denotes the IZ, $A_l$ is the sensing region of MS l, ($l \in \Gamma_i$), and $|A_{IZ}|$ denotes the area of the IZ. The value $p_\mu \in [0,1]$ is the extent of completeness of the collected information, and $\gamma_A$ is the fraction of area in $A_{IZ}$ covered by the cognitive sensing. Therefore, we have $E[p_C] = \gamma_A$. When the distribution of the MSs is uniform, e.g., a two-dimensional Poisson distribution, the values $\gamma_A$ and $p_\mu$ depend on the sensing radius $r_l$. In our embodiments, the sensing radiuses of all MSs in the set $\Gamma_i$ are modeled to be the same.

In the example network shown in FIG. 11, the cognitive regions are shown by the smaller circles each with radius $r_l$. The circles can overlap each other. While most of the area in IZ is within one or more sensing circles, two MSs 1105 in $\Gamma_j$ do not fall within any cognitive sensing circle.

Figure 12:
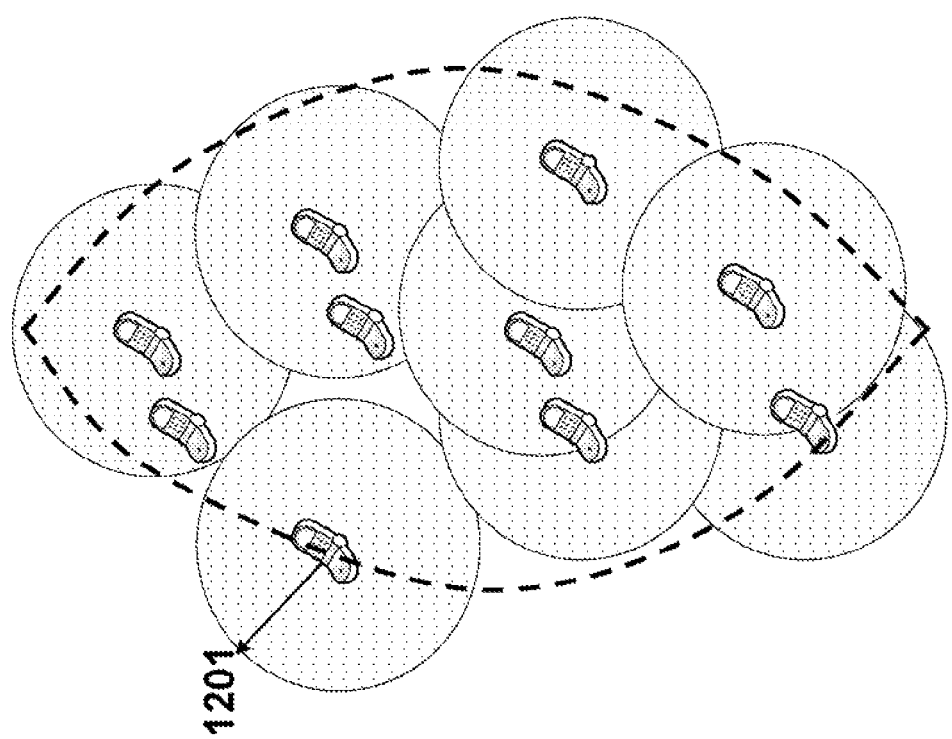
FIG. 12 is a schematic of coverage by the cognitive with increased sensing range.

As shown in FIG. 12, the blank region in the IZ can be reduced as the sensing radius $r_l$ 1201 increases. In FIG. 12, the sensing radius 1201 is increased such that each and every MS in the set $\Gamma_j$ is covered by the cognitive sensing. In the this case, the complete information on the subcarrier usage can be acquired at BS i. In the example shown in FIG. 12, there is still some blank uncovered region in the IZ, however, each MS in $\Gamma_j$ is within at least one of the sensing circles and complete subcarrier usage information can be acquired.

Critical Sensing Radius and Critical Ratio

The completeness of the subcarrier usage information depends on the sensing radius $r_l$. Therefore, the choice of the radius $r_l$ by the MSs in the set $\Gamma_i$ has an impact on how well the BS i can determine the subcarrier usage from the possible interferers, i.e., MSs in the set $\Gamma_j$. The optimal sensing radius is $$|\Gamma_i| \cdot (\pi \hat{r}^2) = |A_{IZ}| = f(\alpha)\pi R^2, \quad (8)$$

where the area f(a) of the IZ is define in Equation (1). The radius $\hat{r}$ is $$\hat{r} = R\sqrt{\frac{f(\alpha)}{|\Gamma_i|}}. \quad (9)$$

The sensing radius $\hat{r}$ provides an ideal lower-bound for the actual sensing radius to cover the area $|A_{IZ}|$ with $|\Gamma_i|$ MSs with non-overlapping sensing region. Given the approximate circular shape of $A_l$, it is impossible to cover a larger area with non-overlapping sensing region; however, $\hat{r}$ still can be used as a lower bound.

The actual sensing radius of the MS is related to $\hat{r}$ by $$r_l = \epsilon \hat{r}, \quad (10)$$

where $\epsilon \in R^+$ is a critical ratio of the sensing radius. When $\epsilon \in [0,1]$, the critical ratio defines the inadequacy of the actual sensing radius, because even the lower bound on the sensing radius is not yet met. When $\epsilon \in [1,+\infty)$, it describes the intentional redundancy of the sensing radius to improve the probability of covering the IZ in the different sensing regions.

Completeness of Information and Sensing Radius

In a Boolean sensing model, where points are randomly placed on an infinite plane with density $\lambda_D$, if circles of radius of r are drawn centered at the randomly-placed points, the probability that a spot on the infinite plane is not covered by any of these circles is $$f_u = \exp(-\lambda_D \pi r^2). \quad (11)$$

Although we use a finite IZ instead of an infinite plane, we can still use the above result to approximate the relationship between the completeness of information and the sensing radius $r_l$, which is assumed to be identical for all the MSs in the set $\Gamma_i$. Specifically, if the density parameter is $$\lambda_D = \frac{|\Gamma_i|}{|A_{IZ}|},$$

and the sensing radius is $r_l = \epsilon \hat{r}$, the expected completeness of the information collected on the subcarrier usage in IZ is $$E[p_\mu] = 1 - \exp(-\lambda_D \pi r_l^2) \quad (12)$$

$$= 1 - \exp\left\{-\frac{\pi|\Gamma_i|}{|A_{IZ}|}\left(\epsilon \cdot R\sqrt{\frac{f(\alpha)}{|\Gamma_i|}}\right)^2\right\}$$

$$= 1 - \exp(-\epsilon^2).$$

As the critical ratio increases, the probability that the entire IZ is covered increases at an exponentially-squared rate. Therefore, when the MSs in the set $\Gamma_i$ are able to increase the sensing radius, i.e., the sensing range is larger than the minimal requirement $\hat{r}$, the subcarrier usage information in $\Gamma_j$ that is acquired at the BS i quickly becomes complete.

Reward from BS

Because transmitting probing signal to collect the subcarrier usage consumes power, the BS should encourage the cognitive sensing by rewarding the MSs that perform the cognitive. This reward should increase monotonically with the sensing range of MS, because power consumption for sensing increases with larger sensing range. In one embodiment, the reward from BS is in the form of an increase in the downlink transmit power. Increasing the transmit power can increase the range of the MS, increase the received SNR at MS, and decrease the required receive power for MS.

When a MS does not perform cognitive sensing and there is no reward, the MS in the IZ is allocated transmission power $P_0$. However, if a MS l in the IZ collects the subcarrier usage information within a radius $r_l$, the BS i allocates transmission power $P_0 + R_r r_l^\rho$. In the additional reward power $R_r r_l^\rho$, $R_r$ is the reward factor selected by the BS i and $\rho$ is a path loss exponent that usually takes value in a range 2 to 5, which describes how power-consuming the sensing process is for the MS with respect to the sensing range.

Tradeoffs for MS in Cognitive Sensing

As stated above, one cost for the MSs in the $\Gamma_i$ to perform the cognitive sensing is the power consumption associated with the sensing. Let $C_1$ be a positive constant that specifies the power required to perform the cognitive sensing within a circular region of unit radius. The cost of power consumed for the sensing within the radius $r_l$ can then be given as $P_S = C_1 r_l^\rho$. The path loss exponent $\rho$ describes how the power consumption in sensing varies with sensing radius, and depends on the wireless environments of the MS. The value of $\rho$ usually is in the range of [2, 5], where $\rho=2$ corresponds to the free-space line-of-sight (LOS) environment and $\rho=5$ describes a lossy indoor environment.

The benefit of performing cognitive sensing is two-folded. First, the power reward from the BS can compensate for the power consumed by MS itself. Second, the information collected by the cognitive sensing can be used by the BS to reduce subcarrier collisions, which wastes receiving power in the MS.

To model the two benefits of the cognitive sensing, let $C'_2$ be the amount of receive power wasted when a subcarrier collision occurs, $p_{IC}$ be the probability of a subcarrier collision due to the incompleteness of the collected information, i.e., the blank area in FIG. 11. Then we have $$p_{IC} = \beta_j f(\alpha)(1 - E[p_\mu]) \qquad (13)$$
$$= \beta_j f(\alpha) \cdot \exp(-\varepsilon^2).$$

If $C_2 = C'_2 \beta_j f(\alpha)$, then the power wasted in receiving collided downlink transmission is $P_W = C_2 \exp(-\epsilon^2)$.

The downlink transmission, power reward the MS receives from the BS is $R_r r_l^\rho$, which also serves as the incentive for the MS to perform cognitive sensing. Because such reward is beneficial to the MS, the reward is related to an equivalent saving in MS's own battery power consumption. This equivalency can be modeled by a translation factor $\sigma_{i,r} \in R^+$. With the translation factor $\sigma_{i,r}$, the reward $R_r r_l^\rho$ by the BS on the downlink transmission power is equivalent to a power saving of $$\frac{R_r r_l^\rho}{\sigma_{i,r}}$$

at the MS.

The translation factor $\sigma_{i,r}$ is a "currency exchange rate" that facilitates the MS to measure the value of the increase in downlink transmission power with respect to its own power saving. The choice of $\sigma_{i,r}$ is related to how MS compares the benefits of increasing downlink power with decreasing sensing power consumption. For example, when $\sigma_{i,r} > 1$, the factor indicates that the increase in downlink transmission power is less valuable than the saving in its own battery power, while $\sigma_{i,r} < 1$ means that the MS prefers an increase in downlink transmission power.

Therefore, the total power saving for MS that performs cognitive sensing within radius of $r_l$ is $$P_{MS} = \left(\frac{R_r}{\sigma_{t,r}} - C_1\right)(\varepsilon \hat{r})^\rho - C_2 \exp(-\varepsilon^2). \qquad (14)$$

Tradeoffs for Encouraging Cognitive Sensing

The downlink transmission power of the BS is usually also limited by regulations. Therefore, the BS is also interested in minimizing its downlink transmission power while providing services to the MSs.

To motivate the MSs in $\Gamma_i$ to engage in collecting information of subcarrier usage in $\Gamma_j$, the BS i increases the transmission power to the MSs to encourage cognitive sensing. The return of this increase in transmission power is that the BS i can acquire the information on the possible interferers in the $\Gamma_j$. Therefore, the net return in power saving to BS i by rewarding cognitive sensing of the MSs is $$P_{BS} = \beta_j f(\alpha)(P_0 - \exp(-\epsilon^2) \cdot [P_0 + R_r(\hat{r}\epsilon)^\rho]). \qquad (15)$$

Continuous Stackelberg Leader-Follower Game Between BS and MSs

Modeling Utilities for BS and MS

To understand the behaviors of the BS and the MSs, their interactions can be modeled as multiple Stackelberg leader-follower games. Specifically, to simplify the model, all the MSs in the set $\Gamma_i$ select the same sensing radius $r_l$. In this case, multiple Stackelberg games can be modeled by a single two-player game between the BS and a MS. In the following, the translation factor is $\sigma_{i,r} = 1$.

The game is to maximize power saving. The utilities of BS and MS depend on a number of parameters, such as the power $C_1$ required for sensing a unit circular region. This is a direct result of hardware design of the MS unit. The amount of power wasted in subcarrier collision is $C_2 = C'_2 \beta_j f(\alpha)$, where $C'_2$ is the amount of receive power wasted when a subcarrier collision occurs. The critical radius determined by the distribution of MSs and the network topology is $$\hat{r} = R \sqrt{\frac{f(\alpha)}{|\Gamma_i|}},$$

and $\rho$ is the path loss exponent that is only determined by the wireless environment near the MS. Therefore, none of the parameters $C_1, C_2 \hat{r}$ or $\rho$ can be controlled by the MS or BS in the game. Furthermore, the power $P_0$ does not directly affect the attitude of either player towards cognitive sensing. The value of the translation factor $\sigma_{i,r}$ serves to convert transmission power reward to the power saving of the MS, and does not capture the essential aspect for understanding the interactions between BS and MS, therefore, it is also assumed pre-fixed in the game.

From the above, the parameters that can be determined by the two players (BS and MS) of the game and affect the outcome of the game are $R_r$ and $\epsilon$. Therefore, the utility of the two players in the game can be written as $$U_{BS}(\epsilon, R_r) = P_0 - \exp(-\epsilon^2) \cdot [P_0 + R_r(\hat{r}\epsilon)^\rho] \qquad (16)$$

and $$U_{MS}(\varepsilon, R_r) = P_{MS} = \left(\frac{R_r}{\sigma_{i,r}} - C_1\right)(\varepsilon \hat{r})^\rho - C_2 \exp(-\varepsilon^2), \qquad (17)$$

which are derived from Equations (14) and (15), respectively. Particularly, the BS can select $R_r$ while the MS selects the value of $\epsilon$.

Decision Makings in the Stackelberg Game Between BS and MSs

The decision space of the BS is $\{R_r : R_r \in R^+\}$, and the decision space of the MS is $\{\epsilon : \epsilon \in R^+\}$. That is, the decision of both players in the game span a continuous space $R^+$. Therefore, the game is modeled as a continuous Stackelberg game. In this Stackelberg game, the sequential decisions are initiated by the BS i, which acts as the leader and the decides first. The MS is the follower, which makes a decision after observing the decision from the BS i.

The value of $\hat{r}$ is determined objectively by BS i because $\hat{r}$ is determined by Equation (9) and is fixed for a given network topology. The BS i as the leader decides on the value of the reward factor $R_r$ and broadcasts $R_r$ to all MSs in $\Gamma_i$. The follower (MS) observes the decision of the BS i and determines the sensing: range $r_l = \epsilon \hat{r}$ by deciding on the value of $\epsilon$.

FIG. 13 shows the pseudo code for the interactive decision making process. Initialization determines the values of the non-decision-related parameters, i.e., $C_1, C_2, \hat{r}, P_o, \rho$ and $\sigma_{i,r}$. Decision making between the two players begins with the BS. To maximize its own utility, the BS has to derive the optimal decision on $R_r$. Because the utility $U_{BS}(\epsilon, R_r)$ of the BS is determined by both $\epsilon$ and $R_r$, the BS has to predict the decision on $\epsilon$ that is taken by MS. To do so, BS assumes rationality in the MS and predicts that the MS always makes the optimal decision that maximizes its own utility as well. Thus, the BS can determine the optimal response of MS $\tilde{\epsilon}^* = g_1(R_r)$ as a function of $R_r$ in statement (i) 1301.

Then, the BS can reduce its own utility function to a function, of only one single variable $R_r$, i.e., $U_{BS}^*(R_r) = U_{BS}(g_1(R_r), R_r)$ in statement (ii) 1302, from which the BS can determine its own optimal decision $R_r^*$ in statement (iii) 1303. After BS makes its decision on the reward factor $R_r = R_r^*$, the MS observes the decision, and decides the range for cognitive sensing by determining the optimal value of critical value $\epsilon^*$, such that the sensing radius is $r_f = \epsilon^* \hat{r}$. This range maximizes its own utility $U_{BS}(\epsilon, R_r^*)$ in statement (iv) 1304.

Optimal Strategy and Nash Equilibrium

To determine the optimal strategies adopted by different players, a path loss exponent of $\rho=2$ is used. The prediction by the BS upon the rational response from MS suggests that the optimal decision of the MS can be described as follows.

If $R_r \geq \sigma_{t,r} C_1$, then the MS always performs cognitive sensing with, a maximal sensing range according to its sensing capacity.

$$\text{If } 0 < C_2 \leq \left(C_1 - \frac{R_r}{\sigma_{t,r}}\right)\hat{r}^2,$$

the MS never performs cognitive sensing.

$$\text{If } 0 < \left(C_1 - \frac{R_r}{\sigma_{t,r}}\right)\hat{r}^2 < C_2,$$

then the optimal response of the MS, is to perform cognitive sensing within a range of $r_\epsilon = \tilde{\epsilon}^* \hat{r}$, where $\tilde{\epsilon}^*$ is a function of $R_r$, and can be given as $$\tilde{\epsilon}^*(R_r) = \sqrt{\ln \frac{C_2}{\left(C_1 - \frac{R_r}{\sigma_{t,r}}\right)\hat{r}^2}}. \tag{18}$$

The optimal response of the MS, as described above, suggests that when the MS prefers the reward on the downlink transmission power and/or the reward factor is large enough compared to the cost of sensing, i.e., $R_r \geq \sigma_{t,r} C_1$, the power consumed by cognitive sensing always is beneficial. In this case, the MS tries to cover a sensing region as large as possible.

In contrast, if the cost of sensing is large compared to the possible reward, then the MS never performs cognitive sensing.

The two scenarios above correspond to the trivial cases when cognitive sensing is always profitable or always harmful to MS. While such extreme cases may exist, usually the balance in practice is some where in between.

When $$0 < \left(C_1 - \frac{R_r}{\sigma}\right)\hat{r}^2 < C_2,$$

whether or not a specific sensing radius is profitable depends directly on the reward factor $R_r$ promised by BS, and the optimal response can be given as a function of $R_r$ in Equation (18).

The following embodiments are based on the last scenario. The utility of the BS when the MS selects the optimal response is $$U_{BS}^*(R_r) = U_{BS}(\tilde{\epsilon}^*(R_r), R_r) \tag{19}$$

$$= P_0 - \frac{\left(C_1 - \frac{R_r}{\sigma_{t,r}}\right)\hat{r}^2}{C_2}\left[P_0 + \hat{r}^2 R_r \ln \frac{C_2}{\left(C_1 - \frac{R_r}{\sigma_{t,r}}\right)\hat{r}^2}\right],$$

and the optimal decision by the BS on $R_r$ can be obtained by solving $$\frac{\partial U_{BS}^*(R_r)}{\partial R_r} = 0,$$

which is the solution $R_r^*$ to the following equation $$\frac{f_1(\cdot)\hat{r}^2 + P_0}{\sigma_{t,r}} = \left(C_1 - \frac{R_r}{\sigma_{t,r}}\right)f_2(\cdot), \tag{20}$$

for $R_r$, in which $f_1(\cdot) = R_r \ln[g(R_r)]$, $f_{12}(\cdot) = \frac{\partial f_1(\cdot)}{\partial R_r}$ and $$g(R_r) = \frac{C_2}{\left(C_1 - \frac{R_r}{\sigma_{t,r}}\right)\hat{r}^2}.$$

While a closed-form solution for $R_r^*$ is difficult to derive from Equation (20), the optimal decision can still be evaluated numerically, given the large computation power of the BS. After obtaining the value of $R_r^*$, the MS will be notified of $R_r^*$ and the optimal decision of MS can then be given as $$\epsilon^* = \tilde{\epsilon}^*(R_r)|_{R_r = R_r^*} = \sqrt{\ln \frac{C_2}{\left(C_1 - \frac{R_r^*}{\sigma_{t,r}}\right)\hat{r}^2}}. \tag{21}$$

In this interactive decision making process, the BS is responsible for most of the computational task for the optimal decision. For example, the BS first predicts the optimal response function of the MS, and then derives its own optimal strategy by backward derivation.

In contrast, the MS only needs to determine an optimal value for its strategy, instead of a function, after the decision is made at the BS. This imbalance of computational complexity is desirable in practice, because the BS has more advanced computational capacity and is not constraint in its computational power, while the MS usually operate with limited computational and battery power.

When $$0 < \left(C_1 - \frac{R_r}{\sigma_{t,r}}\right)\hat{r}^2 < C_2,$$

the rational outcome of the continuous Stackelberg game is the strategy pair $\{R_r^*, \epsilon^*\}$, in which the BS promises to reward the additional transmission power $R_r^* r_i^2$ to the MS that performs cognitive sensing with the range of $r_i$, while the MS decides to perform sensing with the range $r_i^* = \epsilon^* \hat{r}$. This outcome exists, under the condition of $$0 < \left(C_1 - \frac{R_r^*}{\sigma_{t,r}}\right)\hat{r}^2 < C_2,$$

is the unique Nash Equilibrium for the game. This can be verified from the definition of Nash Equilibrium. If the outcome $\{R_r^*, \epsilon^*\}$ for the BS, given that MS decides to perform sensing with radius $r_i^* = \epsilon^* \hat{r}$, then its utility cannot increase by changing $R_r^*$, because $R_r^*$ already achieve the maximal possible utility, per statement (i) and (ii) in FIG. 13. On the other hand, for the MS, given a reward factor $R_r^*$, its utility cannot be increased by selecting a critical value other than $\epsilon^*$ either, per statement (iv) in FIG. 13. Because the Nash Equilibrium describes the outcome in which no player can be better off by acting independently, the outcome $\{R_r^*, \epsilon^*\}$ is therefore the unique Nash Equilibrium by definition.

Interference Avoidance by Statistical Traffic Models

Inaccuracy of Collected Information Over Time

In a dynamic mobile network, the subcarrier usage information 211 is valid only for a limited time. However, the information collected cannot be updated in real time, because continuous updating wastes resources, and is usually impractical. Therefore, periodic updates of current usage are preferred. The length of the interval between the updates can significantly impact the performance interference avoidance.

Figure 14:
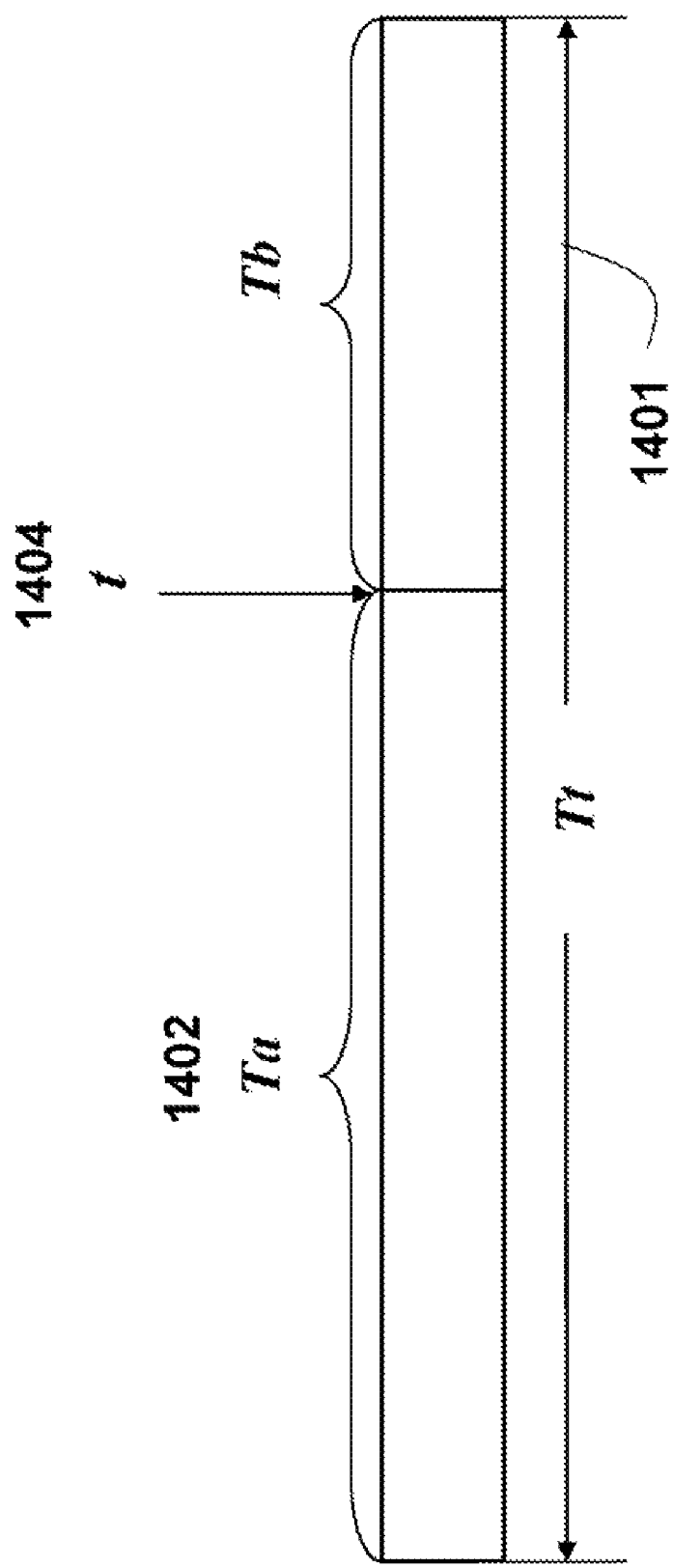
FIG. 14 is timing diagram of current age and future subcarrier usage according to an embodiment of the invention.

FIG. 14 shows the timing of the update according to an embodiment of the invention. The duration for the validity of the subcarrier usage information is $T_t$ 1401, an unknown random variable dictated by the infrastructure. The BS i is notified of subcarrier usage at a random time t 1404 after the subcarrier has been used for a time $T_a$ 1402. The problem is to determine the amount of time $T_b$ the usage remains valid, i.e., $T_b = T_t - T_a$.

Current Age and Future Life of a Current Transmission

We use a renewal-reward process to solve this problem. Renewal-reward theory is a branch of probability theory that generalizes Poisson processes for random holding times. If the detection occurs at the random time point t, then the expected duration at the time of detection is $$E[T_a] = \frac{2E[T_t]^2 - E[T_t]^2}{2E[T_t]}, \quad (22)$$

while the length of future duration $T_b$ is $$E[T_b] = \frac{E[T_t^2]}{2E[T_t]}, \quad (23)$$

for any arbitrary distribution of the total duration $T_t$.

Constant Traffic Load in the Interfering Cell

We presume that the traffic load in the interfering cell is relatively constant over time. This indicates new subcarrier usage is initiated after the current subcarrier usage ends. In addition, upon termination of the current subcarrier usage, a new downlink subcarrier is selected randomly after termination. Therefore, the subcarrier usage information collected at the time t can be considered accurate for a random duration $T_b = T_t - T_a$.

Information Accuracy and Update Interval

With the periodic update on the current subcarrier usage in the IZ, if the period is $T_r$, then the information is accurate as long as the allocation of the current subcarrier in the interfering cell does not change, i.e., the current transmission does not end before the next round of information collecting. Accordingly, the accuracy of the information over time $T_r$ is $$\xi_A(T_r) = Pr(T_b \geq T_r). \quad (24)$$

Specifically, $T_r = 0$ corresponds to the ideal case in which the information is collected and updated continuously. We describe the updating for different types of traffic.

Voice Traffic

Expected Future Life with Exponentially-Distributed Duration

For voice traffic, the duration of each transmission and the subcarrier usage can be described by a light-tail exponential distribution. If the duration of the downlink transmission is denoted by a random variable $X = T_t$, then its probability distribution function (pdf) is $$p_E(x) = \begin{cases} \lambda \exp(-\lambda x), & x \geq 0 \\ 0 & x < 0 \end{cases}. \quad (25)$$

Given this distribution on the transmission duration, the expected future life of a current subcarrier usage can be determined, from Equation (23), as $$E[T_b] = \frac{E[X^2]}{2E[X]} = \frac{\frac{1}{\lambda^2}}{2\frac{1}{\lambda}} = \frac{1}{\lambda}, \quad (26)$$

in which $X = T_1$ is the random variable that describes the total duration of the voice traffic.

That is, the expected remaining duration of the current subcarrier usage in $\Gamma_j$ is $1/\lambda$, as observed in the cell i at a random time. This expected remaining duration equals the expected duration of $T_t$, and can also be obtained from the unique memoryless property of exponential distribution. However, the Equation (22) is more general and is valid for any distribution.

Normalized Information Update Frequency (NIUF)

In practice, the BS i can obtain, through past observation, the rate $\lambda$ of the exponential distribution that governs the duration of the subcarrier usage in the cell j and determine the expected future life of the current transmission. The stations in the cell i then determines the frequency of update.

A normalized information update frequency (NIUF) is $$\mu = \frac{E[T_b]}{T_r}, \quad (27)$$

where $T_r$ is the interval between two consecutive rounds of information collecting. In this case, the accuracy of the current Information over the duration of $T_r$ is $$\xi_A\left(T_r = \frac{E[T_b]}{\mu}\right) = Pr\left(T_b \geq \frac{E[T_b]}{\mu}\right) \qquad (28)$$

$$= \int_{\frac{E[T_b]}{\mu}}^{\infty} \lambda \exp(-\lambda x) dx$$

$$= \exp\left(-\frac{E[T_b]}{\mu} \cdot \frac{1}{E[T_b]}\right)$$

$$= \exp\left(-T_r \cdot \frac{1}{E[T_b]}\right)$$

$$= \exp\left(-\frac{1}{\mu}\right),$$

i.e., $\xi_A(T_r) = \exp(-\lambda T_r)$ or $\xi_A(\mu) = \exp\left(-\frac{1}{\mu}\right)$.

Single Transition on a Physical Subcarrier During Update Interval

If the current subcarrier usage information is acquired at the time t, and the traffic of the current usage ends at time t+T', such that T'<$T_r$, then a random subcarrier is assigned to newly-initiated traffic, under the assumption of a constant traffic load. We assume in this embodiment that a specific subcarrier can experience only one transition during the update interval $T_r$.

With the above single-transition assumption, the new traffic does not end before time t+$T_r$. The single-transition assumption allows us to investigate the impact of inaccuracy over the update interval $T_r$, which is not unreasonably long. When studying the performance over the time T, T can be partitioned into multiple update intervals.

Affects of the Inaccuracy over Time in Blind Optimization

When the information 211 on subcarrier usage in the IZ 105 is exchanged via the infrastructure 210, it is complete and accurate. The number of collisions for blind optimization is described above. However, during the interval $T_b$, and before the next round of information collecting for blind optimization, the subcarrier usage in the cell can change, due to early termination of current transmissions. This renders the current information inaccurate and can introduce additional subcarrier collisions.

The expected number of the additional subcarrier collision that can occur during a future duration of T, assume T can be partitioned by $T_r$, is $$E[C_B^a(T, T_r)] = \frac{T}{T_r}\beta_i\beta_f S \cdot \left[1 - \xi_A\left(\mu = \frac{T}{T_r}\right)\right]f^2(\alpha) \qquad (29)$$

$$= \frac{T}{T_r}\beta_i\beta_f S \cdot \left[1 - \exp\left(-\frac{T_r}{T}\right)\right]f^2(\alpha)$$

$$= \Phi(T, T_r).$$

It can be shown that $$\frac{\partial \Phi(T, T_r)}{\partial T_r} < 0,$$

therefore, the expected number of collision introduced by the inaccuracy of the information over time is a monotonic decreasing function of $T_r$, which suggests that shorter updating period, i.e., higher NIUF can reduce the impact of inaccuracy over time. Further, it can be shown that $$\lim_{T_r \to 0} \Phi(T, T_r) = 0$$

for any value of T. The expected number of total subcarrier collisions over duration of T is $$E[C'_B(T,T_r)] = E[C'_B(T,T_r)] + E[C_B^*], \qquad (30)$$

where $E[C_B^*]$ equals $E[C_B]$ from Equation (3), $E[C_B^*]$ denotes the expected number of subcarrier collisions under semi-static subcarrier usage, i.e., subcarrier allocation is not dynamic during T, or continuous information update (i.e., $T_r \to 0$).

By comparison, the expected number of subcarrier collisions with random subcarrier allocation, when no information is collected and no interference avoidance is performed, over a duration of T is $$E[C_R^r(T)] = \frac{T}{T_r}f^2(\alpha)\beta_i\beta_j[2 - \exp(-T_r\lambda)]S. \qquad (31)$$

Both Equations (30) and (31) are based on the single-transition assumption during the period of $T_r$.

It can be shown that when a reasonable update Interval, e.g., when $T_r \leq E[T_b]$ or $\mu \geq 1$, is selected, the blind optimization 372 can still dramatically reduce the expected number of subcarrier collisions, even though the subcarrier usage information is inaccurate between the update intervals. For example, when $\mu=1$, a 80% reduction in subcarrier collision can be achieved when traffic loads is less than about 90%.

Scheduling for Fairness in Time-sharing the Information Update Interval

Upon the collection of the subcarrier usage information, the updating interval $T_r$ is determined such that the BS can assume with a prediction accuracy $\xi_A(T_r)$ that currently collected information is valid for time $T_r$. Because such information is usually costly to obtain, careful scheduling is performed to make the best use of the information.

Specifically, if multiple MSs in $\Gamma_i$ are to time-share a subcarrier that is assumed to be collision-free with probability $\xi_A(T_r)$ during the next $T_l$ period of time, the fairness of determining the sharing order of the multiple MSs is vital to achieve fairness among the MSs and/or to meet different QoS demands of different MSs.

Figure 15:
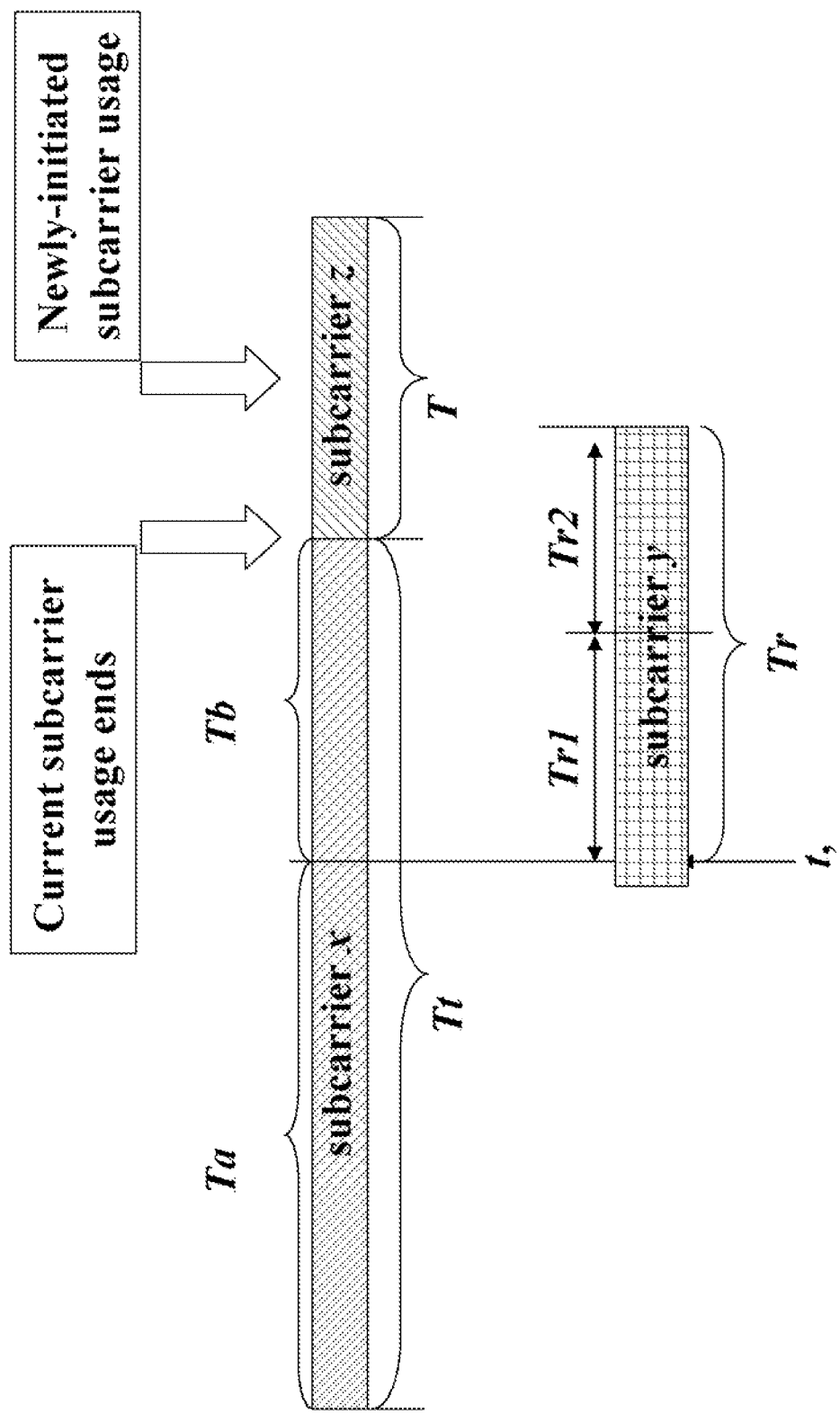
FIG. 15 is a time diagram of shared subcarrier allocation according to an embodiment of the invention.

FIG. 15 shows an example where the information is acquired periodically for intervals $T_r$. Current subcarrier usage is detected at the time point t. Therefore, no information update on the interferers is available during the time interval of [t,t+$T_r$]. The current subcarrier x is in use in the cell i. A subsequent newly initiated usage is subcarrier z. Two other MS need downlink transmissions of duration of $T_A$ and $T_{r2}$, respectively, such that $T_{r1}+T_{r2}=T_r$. For an effective usage of the frequency resource, the two MSs can sequentially share a subcarrier y during the next period of time $T_r$. Therefore, we need to determine order for these two MS. The probabilities of collision for time slots $T_{r1}$ and $T_{r2}$ are different.

Vulnerability Probability

If the subcarrier y is time-shared by multiple MSs in the cell i during the interval $T_r$, then $P_k^V$ is the probability that the duration of the next newly-initiated subcarrier z usage partially or totally overlaps with the transmission duration of the $k^{th}$ MS. In the example shown in FIG. 15, the usage of the current subcarrier x ends at time t+$T_b$, and when a new subcarrier z can be initiated. Because $T_{r1}<T_b<T_{r1}+T_{r2}$, the transmission during time $T_{r2}$ is vulnerable to collision, while the transmission during time $T_{r1}$ is not vulnerable.

Note that when a transmission is vulnerable to collision, it does not mean that a subcarrier collision must happen. Because the newly generated traffic in the cell is assigned a subcarrier randomly, the new subcarrier z may or may not collide with subcarrier y. A collision occurs when y=z. The probability of subcarrier collision for the MS in cell i that transmits in the $k^{th}$ time slot is $P_k = P_k^V \cdot f(\alpha) \beta_j$.

When two MSs sequentially share the same subcarrier during the time $T_r$, assuming without loss of generality that MS 1 is granted the subcarrier usage first with $T_{r1} = \eta T_r$ ($0 < \eta < 1$) and MS 2 is allocated the same subcarrier for the rest duration $T_{r2} = (1-\eta)T_r$, the vulnerability probabilities of the two MSs is $$P_1^V(\eta, \xi_A) = Pr\{T_b < \eta T_r\} \tag{32}$$
$$= \int_0^{\eta T_r} \lambda \exp(-\lambda x) dx$$
$$= 1 - \exp(-\lambda \eta T_r)$$
$$= 1 - \xi_A^\eta(T_r)$$

And $$P_2^V(\eta, \xi_A) = Pr\{T_b < T_r\} - Pr\{T_b + T_t' > \eta T_r\} \tag{33}$$
$$= 1 - \xi_A(T_r) - Pr\{Y_t < \eta T_r\}$$
$$= \xi_A^\eta(T_r)[1 - \eta \ln \xi_A(T_r)] - \xi_A(T_r),$$

in which $\xi_A(T_r)$ is the prediction accuracy associated with time $T_r$ determined in Equation (23), and $Y_t = T_b + T_t'$ is the sum of two exponential random variables. Therefore $Y_t$ is a Gamma distribution with a shape parameter 2, and rate $\lambda$. It can be shown that when the prediction accuracy is reasonably accurate, e.g., $\xi_A(T_r) > 0.2$, the vulnerability probability of the first MS is always lower than that of the second MS. Thus, the first MS is less likely to suffer a subcarrier collision.

More generally, if the interval $T_r$ is shared among K MSs (K>1), the period $T_r$ can be partitioned into K time slots and the $k^{th}$ MS is allocated the $k^{th}$ time slot. The duration, of the $k^{th}$ slot is $\rho_k T_r$ such that $\eta_0 = 0$ and $$\sum_{k=0}^{K} \eta_k = 1.$$

The probability of collision in the $k^{th}$ MS is $$P_k^V(\xi_A) = Pr\left\{[T_b, T_b + T_t'] \cap \left[\sum_{\gamma=0}^{k-1} \eta_\gamma T_r, \sum_{\gamma=0}^{k} \eta_\gamma T_r\right] \neq \emptyset\right\} \tag{34}$$
$$= 1 - \left(\begin{array}{c} Pr\left\{T_b > \sum_{\gamma=0}^{k} \eta_\gamma T_r\right\} + \\ Pr\left\{(T_b + T_t') < \sum_{\gamma=0}^{k-1} \eta_\gamma T_r\right\} \end{array}\right)$$
$$= 1 - \xi_A^{L_k}(T_r) - F_{Y_r}(L_{k-1}T_r)$$
$$= \xi_A^{L_k-1}(T_r)[1 - L_{k-1}\ln \xi_A(T_r)] - \xi_A^{L_k}(T_r).$$

Fairness and Prioritization in Scheduling

When multiple MSs in the cell share the transmission interval $T_r$ between two consecutive rounds of information update, the analytical result derived above shows that when the MS is allocated to different slots during $T_r$, the probabilities of subcarrier collisions differ. Protocols can be designed to resolve this possible unfairness issue.

Fair scheduling can be implemented by keeping historical record on the slots different MSs are assigned in different intervals. In the example in FIG. 15, which shows the scenario of two MSs sharing, when $T_r$ is chosen such that a reasonable prediction accuracy is achieved and being assigned the first slot is preferred. If the historical record shows that MS 1 was usually assigned to less preferred time slot(s), then MS 1 should be assigned to the first time slot in current subcarrier allocation, in the interest of fairness.

More generally, for each MS l in the set $\Gamma_i$, let the historical index be h=1, 2, . . . , and $P_k^V(l)$ be the vulnerability probability of the MS l in the current round of subcarrier allocation. The historical vulnerability probability for the MS l in round $h^{th}$ is recorded as $P^V(l,h)$. In this case, when a history of length H(h=0, 1 . . . H−1) has been recorded, the current allocation of the MS l to a specific $k^{th}$ slot should be chosen such that $$\frac{\sum_{h=0}^{H-1} P^V(\ell, h) + P_k^V(\ell)}{H+1} \rightarrow P_A, \forall \ell \in \Gamma_i. \tag{35}$$

That is, the current allocation of time slots within the interval $T_r$ should be chosen such that the average vulnerability probability over the historical record approaches $P_A$ for all the MSs in the set $\Gamma_i$.

In contrast, if the transmission task of a particular MS has a higher priority than others, then the BS can exert prioritization over fairness and allocate the time slot that is associated with the smallest vulnerability probability to the high priority MS. In practice, different criteria can be used to justify higher prioritization such as delay-sensitiveness, and urgency of the transmission.

Data Traffic

Pareto Distribution and Truncated Pareto Distribution

When the traffic is dominated by data transmission, the distribution of the transmission length usually has a heavy-tail, which can be described by the Pareto or Bradford distribution. The pdf is $$p_{PE}(x) = \begin{cases} \frac{ab^a}{x^{a+1}}, & x \geq b \\ 0 & x < b \end{cases}. \tag{36}$$

When used to describe the duration of data traffic, the Pareto distribution describes a transmission of length at least b and a shape factor $\alpha$ that usually takes a value from the interval of (0, 2), in correspondence to the heavy-tail property of data traffic. However, a random variable X governed by the distribution in Equation (36) does not have well-defined finite moments. Specifically, all finite moments of a Pareto distributed X are infinite when $0 < a \leq 1$. When $1 < a < 2$, X has a finite first moment (mean) but all $i^{th}$ (i>1) are not defined.

In recognition of the analytical unanimity of the unbounded Pareto distribution, a truncated Pareto distribution is usually used to describe the distribution of the durations of wireless data traffic. Specifically, when there is a higher bound on the maximal length of transmission m, we use the following truncated Pareto distribution to describe the distribution of data traffic duration.

$$p_P(x) = \begin{cases} \dfrac{ab^a}{1 - \left(\dfrac{b}{m}\right)^a x^{a+1}}, & m \geq x \geq b \\ 0, & \text{otherwise} \end{cases} \quad (37)$$

In practice, the upper bound in Equation (37) corresponds to the maximal duration of data traffic allowed by the network.

Expected Future Life with Pareto-Distributed Duration

Using the renewal-reward process, the expected future life of the current subcarrier usage for data traffic can be determined from Equations (23) and (37) as $$E[T_b] = \frac{E[X^2]}{2E[X]} = \frac{bm(a-1)}{2(a-2)} \cdot \frac{m^{a-2} - b^{a-2}}{m^{a-1} - b^{a-1}}, \quad (38)$$

in which $X=T_l$ is the random variable that describes the total duration of data traffic.

Accuracy of Prediction

Unlike the exponential distribution, the major challenge in assessing the prediction accuracy for data traffic is that the governing Pareto distribution is not memoryless. Therefore, while the expected value of the future life can be determined for the currently-observed subcarrier usage by the renewal-reward process of Equation in (23), assessing the accuracy of different prediction schemes requires additional information.

If we use NIUF for the data traffic, then the accuracy of the prediction can be evaluated for different values of the NIUF. When a=1.1, b=2 and m=55, the prediction accuracy for the Pareto distributed data traffic is only slightly lower than that of exponentially distributed data traffic.

Prediction Based on Current Age

When the history of usage is available, from the infrastructure or cognitive sensing, the accuracy of the currently collected information over a $T_r$ period of time can be evaluated analytically. Specifically, if the usage of a subcarrier is known to have lasted for time $T_a$, and the next round of information collecting is performed at time $T_r(T_r \leq m - T_a)$, then the information is accurate within this interval $T_r$ with a probability $\xi_A(T_a, T_r)$, which is $$\xi_A(T_a, T_r) = Pr(T_t \geq T_a + T_r | T_t \geq T) \quad (39)$$

$$= \frac{\displaystyle\int_{T_a+T_r}^{m} \dfrac{ab^a}{1 - \left(\dfrac{b}{m}\right)^a x^{a+1}} dx}{\displaystyle\int_{T_a}^{m} \dfrac{ab^a}{1 - \left(\dfrac{b}{m}\right)^a x^{a+1}} dx}$$

$$= \frac{(T_a + T_r)^{-a} - m^{-a}}{T_a^{-a} - m^{-a}}.$$

If the interval between information collecting is $T_r > m - T_a$, then the subcarrier usages in the set $\Gamma_j$ are definitely going to change during the interval $T_r$, and the prediction accuracy is 0 over the time interval $T_r$. Such a choice is obviously contradictory to the fact that all dada traffic has a length less than m. Therefore, the choice does not provide any advantage over random allocation over the duration $T_r$.

Equivalent to Equation (39), if a particular prediction accuracy $\xi_A^*$ is desired for the task of interference management and $T_a$ is available, then the desired accuracy can be achieved, reversely, by determining that the interval between information updates is $$T_r^*(T_a, \xi_A^*) = [(T_a^{-a} - m^{-a})\xi_A^* + m^{-a}]^{1/a} - T_a. \quad (40)$$

Determining the Information Collection Interval

Unlike the exponential distribution, the Pareto-distribution has memory. Therefore, different values of different current ages result in different value of the expected future validity of usage. However, whether the subcarrier usage information is collected through the infrastructure or cognitive sensing, it is impractical to collect such information for only one subcarrier each time and perform multiple collections each round. Instead, the interval between information update should be identical for all subcarriers in interest. Then, the BS only needs one round of information collecting for each round of interference management. This Interval should reflect the expected future validity of current subcarrier usage, as well as the desired prediction accuracy.

There are two practical approaches that can address this issue. The first one is "average over age" (AoA), and the second is termed as "average over interval" (AoI). For the purpose of determining the interval between two rounds of information collecting and interference avoidance, the current subcarrier usage in the set $\Gamma_j$ is acquired at: the beginning. Meanwhile, for data-traffic, the ages of currently in-use subcarriers is acquired. Obviously, for each subcarrier s used by a MS in the set $\Gamma_j$, its age will, more often than not, be different from that of others, i.e., $T_{a,s1} \neq T_{a,s2}$.

In AoA, the mean of the ages of all subcarriers used in the set $\Gamma_j$ is obtained first for the computation of a desired $T_r^*$. We assume that the subcarrier used in the set $\Gamma_j$ forms the set $\Omega_j$. Then, the average is $$\overline{T}_a = \frac{1}{\Omega_j} \sum_{s \in \Omega_j} T_{a,s}$$

and the update interval is determined by Equation (40) as $T_r^*(\overline{T}_a, \xi_A^*)$.

In AoI, the desired interval for each subcarrier usage $T_{r,B}^*(T_{a,s}, \xi_A^*)$ is determined individually for each subcarrier first, and the final desired interval is $$T_r = \frac{1}{|\Omega_j|} \sum_{s \in \Omega_j} T_{r,s}^*(T_{a,s}, \xi_A^*). \quad (41)$$

The AoI scheme can be evaluated by numerical simulations. If the desired accuracy is above 0.5, then the actual prediction accuracy achieved over the update interval determined by Equation (41) is within 2% of the desired accuracy.

Although the invention has been described by way of examples of preferred embodiments, it is to be understood that various other adaptations and modifications may be made within the spirit and scope of the invention. For example, though much of this description has focused on the downlink, the invention is equally applicable to the uplink. Therefore, it is the object of the appended claims to cover all such variations and modifications as come within the true spirit and scope of the invention.

We claim:

1. A method for reducing inter-cell interference in a wireless frequency division multiplexing network, in which the network includes a set of base stations, and in which an area served by each base station forms a cell, and in which each cell includes a set of mobile stations served by the base station, and in which an area of overlap between the cells form an interference zone, and in which a remaining area of the cells not including the interference zone form a non-interference zone, and in which a spectrum of radio frequencies used by each base station is identical, and in which the spectrum is partitioned into subcarriers, comprising:
   allocating the subcarriers randomly to the set of mobile stations in the non-interference zone, in which the allocated subcarriers become unavailable, and the remaining subcarriers in the spectrum are available;
   allocating the available subcarriers or blocks of subcarriers randomly by each base station if the selected strategy is random allocation;
   allocating the available subcarriers or blocks of subcarriers randomly by one base station and allocating the subcarriers optimally by an other base station if the selected strategy is blind allocation;
   allocating the available subcarriers or blocks of subcarriers optimally by each base station if the selected strategy is joint optimization; and
   selecting in each base station a strategy to allocate the available subcarriers to the set of mobile stations in the interference zone, in which the strategy is selected from random allocation, blind optimization, and joint optimization.

2. The method of claim 1, further comprising:
   identifying the set of mobile stations in the interference zone using handoff information, in which the handoff information is compared with an interference threshold to determine whether the subcarriers are allocated.

3. The method of claim 2, in which the interference threshold is about ten dB less than a handoff threshold.

4. The method of claim 1, further comprising:
   exchanging a historical record of subcarrier usage between the set of base stations.

5. The method of claim 4, in which the allocating is according to the historical record of subcarrier usage.

6. The method of claim 1, in which the blind allocation further comprises:
   logically ordering the available subcarriers; and
   allocating the labeled subcarriers in a reverse order by the other base station.

7. The method of claim 1, in which the joint optimization further comprises:
   logically ordering the available subcarriers;
   allocating the labeled subcarriers in a forward order by the one base station; and
   allocating the labeled subcarriers in a reverse order by another base station.

8. The method of claim 1, in which the selecting is performed using a strategic game.

9. The method of claim 8, in which the strategic game uses a sequential decision making process that lead to a Nash equilibrium.

10. The method of claim 8, in which the strategic game is base station centric.

11. The method of claim 8, in which the strategic game achieves minimum subcarrier collision with a minimum optimization cost.

12. The method of claim 8, in which the strategic game is mobile station centric.

13. The method of claim 12, in which the strategic game includes modeling of a utility function of the mobile station and the base station to transform power reward into an equivalent overall power saving.

14. The method of claim 12, further comprising:
   collecting interference information using cognitive sensing, and in which the strategic game uses a critical sensing radius and a critical ratio of the critical sensing radius during the cognitive sensing.

15. The method of claim 14, in which an effectiveness of the interference information collections is related to the critical sensing radius and the critical ratio.

16. The method of claim 14, further comprising:
   transmitting probe signals by the set of mobile stations in the interference zone; and
   responding subcarrier usage in response to receiving the probing signals.

17. The method of claim 16, further comprising:
   rewarding the mobile stations transmitting the probing signals with increased transmission power from the set of base stations.

18. The method of claim 17, in which transmitting and the rewarding uses a strategic game to determine a sensing radius for the probing signal.

19. The method of claim 12, in which the strategic game is a binary Stackelberg leader-follower game.

20. The method of claim 8, in which the strategic game is adaptive to traffic load and a size of the interference zone.

21. The method of claim 1, further comprising:
   identifying the set of mobile stations in the interference zone using cognitive sensing.

22. The method of claim 1, further comprising:
   updating periodically current subcarrier usage information in the set of base stations.

23. The method of claim 22, in a time interval for the updating depends on types of traffic, and the types of traffic include voice traffic and data traffic.

24. The method of claim 22, in which the updating uses a normalized information update frequency.

25. The method of claim 22, in which the allocating of the subcarriers uses fair scheduling.

26. The method of claim 1, in which set of base stations use a handoff protocol to collect interference information, and the interference information is used during the allocating and selecting.

* * * * *